United States Patent
Zhang

(10) Patent No.: US 10,889,674 B2
(45) Date of Patent: Jan. 12, 2021

(54) METHOD OF PREPARING A GRAFTED COPOLYMER OF LIGNIN AND/OR CELLULOSE

(71) Applicant: BIOFIBER TECH SWEDEN AB, Stockholm (SE)

(72) Inventor: Eric Yijing Zhang, Stockholm (SE)

(73) Assignee: BIOFIBER TECH SWEDEN AB, Stockholm (SE)

( * ) Notice: Subject to any disclaimer, the term of this patent is extended or adjusted under 35 U.S.C. 154(b) by 31 days.

(21) Appl. No.: 16/326,744

(22) PCT Filed: Aug. 24, 2017

(86) PCT No.: PCT/SE2017/050853
§ 371 (c)(1),
(2) Date: Feb. 20, 2019

(87) PCT Pub. No.: WO2018/038672
PCT Pub. Date: Mar. 1, 2018

(65) Prior Publication Data
US 2019/0202956 A1 Jul. 4, 2019

(30) Foreign Application Priority Data
Aug. 24, 2016 (SE) ........................................ 1651139

(51) Int. Cl.

| | |
|---|---|
| *C08F 251/02* | (2006.01) |
| *D21C 1/10* | (2006.01) |
| *D21B 1/02* | (2006.01) |
| *C08L 1/02* | (2006.01) |
| *C08L 97/00* | (2006.01) |
| *D21B 1/16* | (2006.01) |
| *C08H 7/00* | (2011.01) |
| *C08H 8/00* | (2010.01) |
| *C08F 251/00* | (2006.01) |
| *D21C 5/00* | (2006.01) |
| *D21C 1/02* | (2006.01) |
| *D21C 11/00* | (2006.01) |
| *D06M 14/22* | (2006.01) |
| *D21C 1/04* | (2006.01) |

(52) U.S. Cl.
CPC .......... *C08F 251/02* (2013.01); *C08F 251/00* (2013.01); *C08H 6/00* (2013.01); *C08H 8/00* (2013.01); *C08L 1/02* (2013.01); *C08L 97/005* (2013.01); *D06M 14/22* (2013.01); *D21B 1/021* (2013.01); *D21B 1/16* (2013.01); *D21C 1/02* (2013.01); *D21C 1/04* (2013.01); *D21C 1/10* (2013.01); *D21C 5/00* (2013.01); *D21C 11/0007* (2013.01)

(58) Field of Classification Search
CPC ......... C08F 251/02; C08H 8/00; C08L 51/02; D21B 1/16
See application file for complete search history.

(56) References Cited

U.S. PATENT DOCUMENTS

| | | | |
|---|---|---|---|
| 3,330,787 A * | 7/1967 | Faessinger | C08B 15/00 527/311 |
| 3,607,799 A | 9/1971 | Barbehenn et al. | |
| 4,376,852 A | 3/1983 | Lindenfors | |
| 5,651,861 A * | 7/1997 | Larson | D21C 5/027 162/5 |
| 5,741,875 A | 4/1998 | Meister et al. | |
| 8,679,292 B2 | 3/2014 | Hamad et al. | |
| 2019/0161616 A1 * | 5/2019 | Hamad | C08J 3/212 |

FOREIGN PATENT DOCUMENTS

| | | |
|---|---|---|
| CA | 1115908 A1 | 1/1982 |
| EP | 0442508 A1 | 8/1991 |
| JP | 2013-234283 A | 11/2013 |
| WO | WO-2015/117106 A1 | 8/2015 |

OTHER PUBLICATIONS

Taneda, K .et al., Graft Polymerization of Styrene onto Wood Fiber with a Few Initiators. Mokuzai Gakkaishi. 1968; 14(2):121-6 (Abstract provided).

International Search Report and Written Opinion dated Oct. 26, 2017 by the International Searching Authority for Patent Application No. PCT/SE2017/050853, which was filed on Aug. 24, 2017 and published as WO 2018/038672 on Mar. 1, 2018 (Inventor—Zhang; Applicant—Biofiber Tech Sweden AB) (10 pages).

* cited by examiner

*Primary Examiner* — Jeffrey C Mullis
(74) *Attorney, Agent, or Firm* — Ballard Spahr LLP

(57) ABSTRACT

The present invention relates to a method of preparing grafted copolymers of lignin and/or cellulose, comprising the generation of macroradicals in situ by mechanical impact on the backbone of said lignin and/or cellulose of said lignin and/or cellulose containing material and grafting monomers and/or polymers to said backbone. Furthermore, the present invention relates to the grafted copolymers obtainable by said method, composite materials comprising said copolymers as well as to uses thereof.

16 Claims, 14 Drawing Sheets

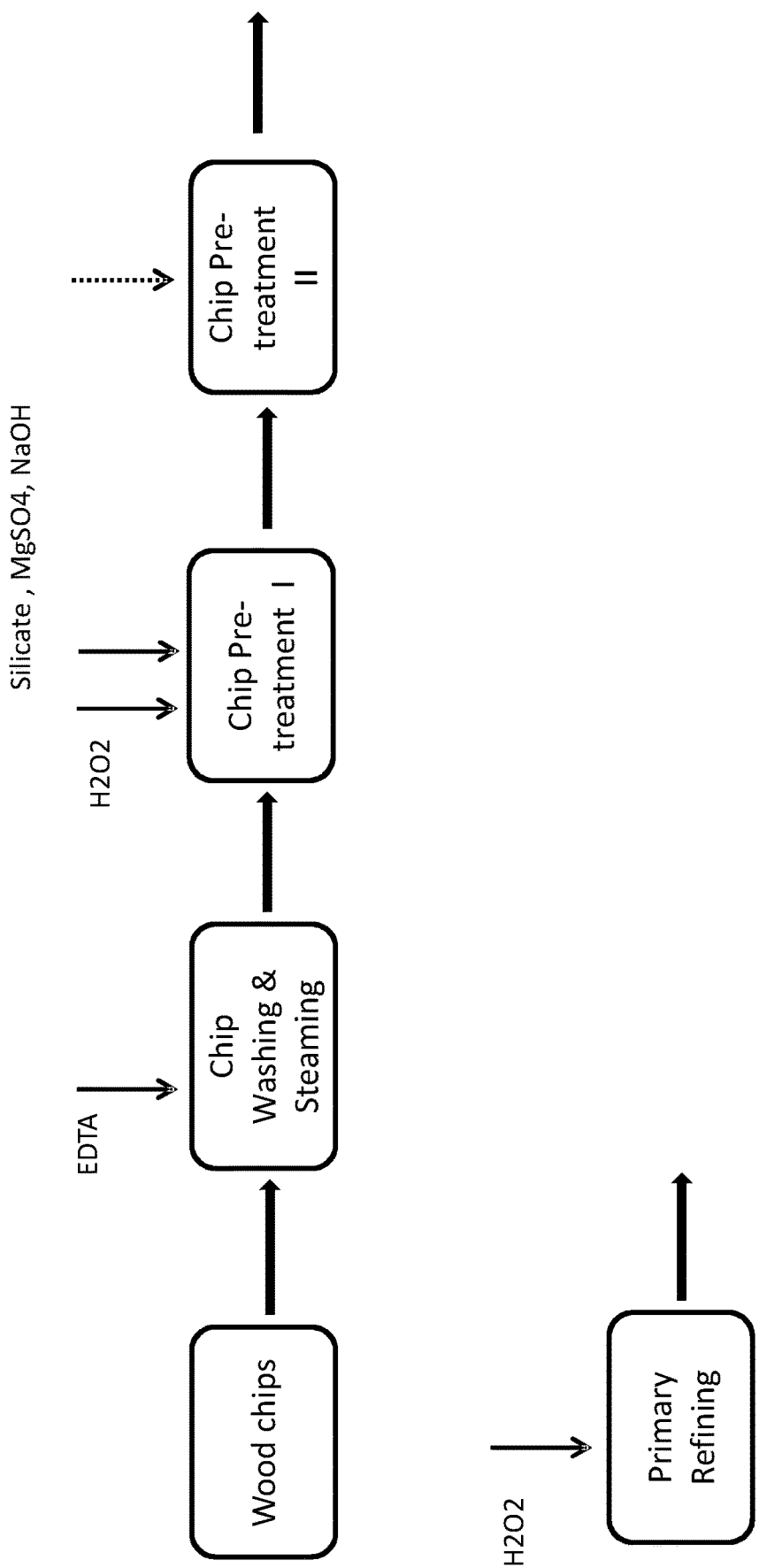

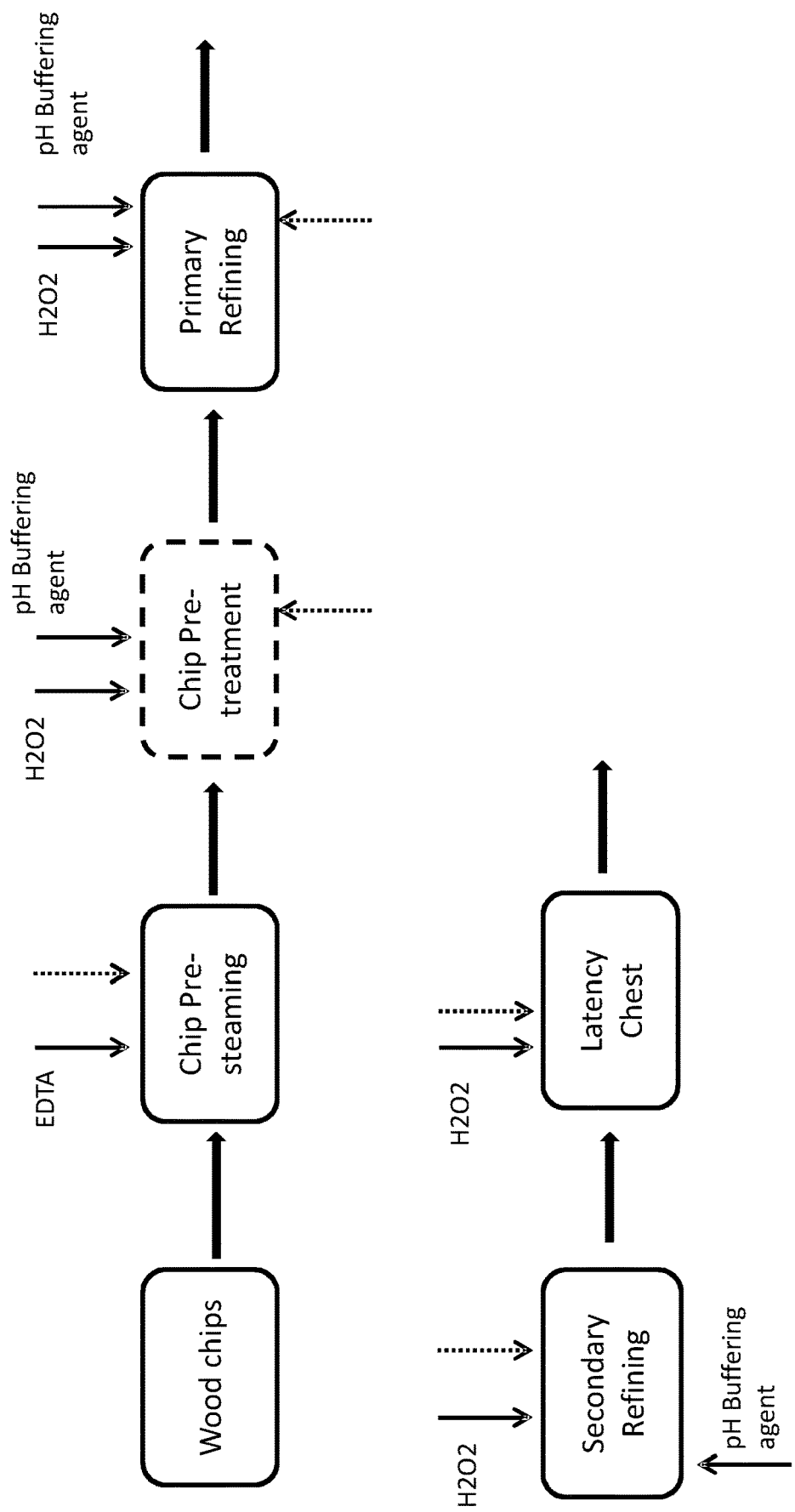

METHOD OF PREPARING A GRAFTED COPOLYMER OF LIGNIN AND/OR CELLULOSE

CROSS-REFERENCE TO RELATED APPLICATIONS

This application is a U.S. National Phase Application of International Application No. PCT/SE2017/050853, filed Aug. 24, 2017, which claims priority to Swedish Patent Application No. SE 1651139-6, filed Aug. 24, 2016.

FIELD OF THE INVENTION

The present invention relates to a method of preparing grafted copolymers of lignin and/or cellulose, comprising the generation of macroradicals in situ by mechanical impact on the backbone of the lignin and/or cellulose in lignin and/or cellulose containing material and grafting monomers and/or polymers to said backbone. Furthermore, the present invention relates to the grafted copolymers obtainable by said method, composite materials comprising said grafted copolymers as well as to uses thereof.

BACKGROUND

Lignocellulosic fibers are hydrophilic and thus upon exposure to moisture they are highly susceptible to loss of mechanical properties. This is a disadvantage since it makes paper and cardboard less suitable for applications which require a high degree of stability and mechanical strength.

Paper and cardboard can be produced from mechanical pulp, which is a pulp in which the fibers in the lignocellulosic material are reduced to constituent fibers by mechanical means in one or more refiners. Traditional mechanical pulping involves forcing wood against a revolving stone, which grinds the wood by abrasive action (stone ground wood). The production of mechanical pulp results in little removal of lignin content, and consequently produces paper and cardboard that is not of as high quality as other pulping methods that remove significant amounts of lignin.

Wood consists of cellulose, hemicellulose and lignin. The lignin is the bonding adhesive bonding the wood fibers together. A pulping process is a fiber separation process, to render wood chips into wood fibers. There are mainly two kinds of pulping processes and pulps. In mechanical pulping wood fibers are separated mainly through mechanical grinding or refining. The result, mechanical pulp, contains lignin. In chemical pulping wood fibers are separated through a chemical process, such as sulphate or sulphite cooking, to produce chemical pulp. The chemical cooking process removes lignin in order to get the wood fibers separated.

Examples of mechanical pulping processes include refiner mechancial pulps (RMP), thermomechanical pulp manufacturing process (TMP), chemithermomechanical pulp manufacturing process (CTMP) and the alkaline peroxide mechanical pulp manufacturing process (APMP). During the thermomechanical pulp manufacturing process, wood chips are exposed to heat treatment by warm steam before entering refiners. Large parts of the chemithermomechanical pulp manufacturing process are similar to the thermomechanical pulp manufacturing process. The main difference lies in pre-treating the lignocellulosic material, normally wood chips, with some kind of chemical agent(s), such as commonly used sodium sulphite or hydrogen peroxide, for instance at a certain temperature and over a certain period of time. In the case of hydrogen peroxide pre-treatments, the process is also called alkaline peroxide mechanical pulping process (APMP).

Lignocellulosic material, such as wood, can be used as starting material in these processes. The wood is normally chopped initially in the pulp manufacturing process into an indeterminate number of chips which are subsequently subjected to further mechanical treatment.

Any known refiner or refiners can be used to defiberate the fibers. The majority of refiners comprise two refining discs, between which the material to be treated is caused to pass. Normally, one disc remains stationary whilst the other rotates at high speed. In another type of refiner, the two refining discs are counter-rotational. A third type of refiner comprises four refining discs in which a centrally placed rotor has refining discs mounted on both sides thereof.

Fibers obtained from mechanical pulp manufacturing processes are referred to as mechanical fibers and are normally used in newsprint, magazine or other kind of publication papers and in packaging as a filling material.

In order to find new applications for mechanical fibers, the addition of new functionalities to the fibers is desired. Examples of such desirable functionalities include for example hydrophobicity, elasticity, three dimensional formability and fire retardency.

Applications of mechanical pulp fibers in plastic composite materials have been studied, but their application is strongly limited due to the poor interactivity of the hydrophilic lignocellulosic materials with the hydrophobic plastic polymers.

U.S. Pat. No. 5,741,875 discloses ways of grafting lignin with alkene or alkyne monomers using organic solvents, such as dimethyl sulfoxide (DMSO) and hydrogen peroxide, under oxygen free environment, which oxygen free environment is obtained by passing $N_2$ through the reaction medium. U.S. Pat. No. 8,679,292 discloses similar reaction systems applied to mechanical pulp fibers, but in aqueous non-oxygen media. These reactions systems are however difficult to implement in industrial scale of pulp and paper manufacturing processes. As there is always oxygen air soluble in the pulp fiber water suspension, it is not practically feasible to spurge the suspension with nitrogen gas in pulp and paper industrial processes.

Thus, there is a continued need in the field for a method for grafting lignin and/or cellulose containing material with new functional groups which can be efficiently applied at industrial scale.

SUMMARY OF THE INVENTION

It is an object of the present disclosure to provide a method for preparing a grafted copolymer of lignin and/or cellulose, which overcomes, or at least mitigates, the limitations and disadvantages of the prior art.

It is another object of the present disclosure to provide a method for preparing a grafted copolymer of lignin and/or cellulose, which can be implemented into a mechanical pulp manufacturing process.

It is yet another object of the present disclosure to provide a grafted copolymer of lignin and/or cellulose, which grafted copolymer possesses desirable characteristics, such as hydrophobicity, elasticity, three dimensional formability and/or fire retardency.

Another object of the present disclosure is to provide a composite material comprising said grafted copolymer.

Thus, in the first aspect of the present disclosure there is provided a method of preparing a grafted copolymer of lignin and/or cellulose, wherein said method comprises the steps of:

subjecting a lignin and/or cellulose containing material in the form of wood chips and/or defiberated wood chips in an oxygen reduced environment to a redox initiator,
exposing said lignin and/or cellulose material to mechanical impact, and
subjecting said lignin and/or cellulose containing material to monomers and/or polymers before, during and/or immediately after exposure to mechanical impact, wherein macroradicals are generated in situ by the mechanical impact on the backbone of said lignin and/or cellulose of said lignin and/or cellulose containing material, and
wherein the monomers and/or polymers are grafted to the backbone of said lignin and/or cellulose.

The method disclosed herein may be a method for preparing a copolymer comprising:
(i) monomer(s) and/or polymer(s); and
(ii) lignin and/or cellulose;
wherein said monomer(s) and/or polymer(s) are grafted onto said lignin and/or cellulose.

Thus, there is provided a method for preparing a copolymer comprising:
(i) monomer(s) and/or polymer(s); and
(ii) lignin and/or cellulose;
wherein said monomer(s) and/or polymer(s) are grafted onto said lignin and/or cellulose,
wherein said method comprises the steps of:

subjecting a lignin and/or cellulose containing material in the form of wood chips and/or defiberated wood chips in an oxygen reduced environment to a redox initiator,
exposing said lignin and/or cellulose containing material to mechanical impact, and
subjecting said lignin and/or cellulose containing material to monomers and/or polymers before, during and/or immediately after exposure to mechanical impact.

The present disclosure provides a novel chemical-mechanical method to incorporate new functionalities into lignin and/or cellulose containing materials by graft polymerization of any carbon-carbon double or triple bond containing synthetic or natural occurring monomers and/or polymers. The process is based on the mechanical refining of wood chips and/or defiberated wood chips whereby lignin radicals and/or cellulose radicals are generated in situ by mechanical impact on the backbone of said lignin and/or cellulose. The radicals on the backbone of said lignin and/or cellulose can then react with added monomers and/or polymers via radical grafting reactions initiated by redox initiators, such as hydrogen peroxide or other peroxide based oxidants.

It will be appreciated that the above-mentioned steps of the method as disclosed herein, may be performed in any order. For example, said lignin and/or cellulose containing material may be subjected to monomers and/or polymers prior to, during or after mechanical impact.

To clarify, grafting can occur between added monomers and the lignin and/or cellulose backbone. The monomer grafted to the backbone can itself be polymerized via radical reactions to form a polymer of its own repeating units, attached to the backbone. Grafting can also occur between the added polymers and the lignin and/or cellulose backbone.

Importantly, in the present method, the lignin and/or cellulose containing material is subjected to monomers and/or polymers before, during and/or immediately after exposure to mechanical impact.

The yield and efficiency of the grafting process essentially depend on how successful the generation of radicals is onto the backbone of lignin and/or cellulose, whereby macroradicals are formed.

Wood is a porous and fibrous structural tissue found in the stems and roots of trees, and other woody plants. It is an organic material, a natural composite of cellulose fibers (which are strong in tension) embedded in a matrix of lignin which resists compression.

As used herein, the term "macroradicals" refers to lignin and/or cellulose itself where radicals have been generated on different sites on its backbone. These sites could be the potential radical generator functions in the lignin molecules and/or the hydroxyl groups or the carbon atoms of the carbinol groups of cellulose in lignocellulosic materials. Once the macroradicals are formed, the graft polymerization occurs, i.e. the macroradicals react with the desired monomers and/or polymers in their proximity.

As used herein, the term "grafting" refers to a process of co-polymerization wherein functional groups are imparted to a polymer. Graft co-polymerization can e.g. be initiated by chemical treatment.

As used herein, the term "grafted copolymer" is a branched copolymer where the components of the side chain are structurally different than that of the main chain.

It is beneficial that the monomers and/or polymers and the at least one redox initiator are well mixed together either during wood chip pre-treatment stage(s), in the refining stage(s) or directly after the refining to ensure that the initiated monomer radicals and/or polymer radicals are available to react with the lignin and/or cellulose radicals (macroradicals) immediately once they are generated by the mechanical impact.

The material used in the present method may be wood chips and/or defiberated wood chips, such as wood chips which are or have been subjected to refining. Defiberated wood chips are compressionally destructured wood chips with partially open structure to facilitate the subsequent refining.

Any lignocellulosic material may be used as starting material. Examples of such materials are wood, bamboo, straw, bagasse, kenaf, ramie, hemp, jute, sisal and cotton. Thus, in one embodiment, the lignin and/or cellulose containing material is selected from the group consisting of wood, bamboo, straw, bagasse, kenaf, ramie, hemp, jute, empty fruit branches from oil palm, sisal and cotton. Wood is the preferred starting material, and both softwoods and hardwoods may be beneficially used, either separately or in combination. The wood is normally initially chopped in the pulp manufacturing process into an indeterminate number of chips. According to the present disclosure, wood chips may be plant chips, for example straw.

In one embodiment, the lignin and/or cellulose containing material is hardwood or softwood. The term "hardwood" as used herein refers to wood from deciduous trees and broadleaf evergreen trees. Hardwood is contrasted to softwood, which comes from conifers, cone bearing seed plants. Hardwoods are not always harder than softwoods, balsa wood being an example of this. Hardwood trees are more varied than softwoods and there are about hundred times more species of hardwood than there are softwoods. Hardwoods usually have broad leaves. Hardwoods all have enclosed nuts or seeds, where softwoods are gymnosperms, naked seed plants. Non-limiting examples of hardwood include alder, ash, aspen, beech, birch, boxwood, cherry, cotton-wood, elm, hackberry, hickory, hard maple, horse chestnut, oak, sassafras, maple, olive tree, poplar, American tulipwood, walnut and willow. The term "softwood" as used herein refers to wood that comes from gymnosperm trees. These are conifers which includes most evergreen trees. Softwood makes up about 80% of the world's production of lumber. The skilled person knows what is meant by hardwood and softwood in the context of starting material for mechanical pulping.

In one particular embodiment, said lignin and/or cellulose containing material is a lignin containing material, such as mechanical pulps, or semi-mechanical pulps.

In one particular embodiment, said lignin and/or cellulose containing material is a cellulose containing material, such as sulfate chemical pulps, sulfite pulps, dissolving pulps, cellulose and cellulose derivatives.

As used to herein, the term "wood chip" refers to a medium-sized solid material made by cutting, or chipping, larger pieces of wood. Wood chips may be produced by a wood chipper to a desirable size. Wood chips may be used as a raw material for producing wood pulp.

Wood chips used in the present method may be substantially uniform in size and free of bark. The optimum size varies with the wood species. It is important to avoid damage to the wood chips as this is important for the pulp properties. In one embodiment of the present method, the wood chips or defiberated wood chips used have a length in the range of 5-30 mm, a thickness in the range of 3-25 mm and a width in the range of 3-25 mm. In another example, the wood chips or defiberated wood chips used have a length in the range of 10-20 mm, a thickness in the range of 5-15 mm and a width in the range of 5-15 mm. However, the wood chips may have any chip size which can enter the refining discs.

In one embodiment, the wood chips or defiberated wood chips are pre-treated, such as chemically pre-treated. Pre-treatment removes some unwanted substances, such as extractives from hardwood. The pre-treatment may comprise chip washing, steaming, chemical treatment with chelating agent, such as EDTA or DTPA, sulfite or hydrogen peroxide, ozone and others, and compressive mechanical treatment in a plug screw and/or other forms of compression screw. Furthermore, the pre-treatment may be performed in one, two, three or more steps depending on the requirements of the mechanical pulp manufacturing process and the properties of the starting material.

In one particular embodiment, the defiberated wood chips are compressionally destructed wood chips with partially open structure.

In one embodiment, there is provided a method wherein the oxygen reduced environment is oxygen deficient. This is advantageous as oxygen is a radical scavenger which may terminate the radical grafting reaction. By pre-steaming wood chips, the air present in the wood chips is depleted by the saturated steams. Further in the refiner itself, chips compression in combination with high steam pressure also leads to an oxygen deficient environment in the refiner.

According to the present disclosure, "oxygen reduced environment" means that the amount of oxygen is reduced compared to the amount of oxygen present in air.

According to the present invention, no nitrogen purging is necessary. Nitrogen purging is difficult to implement in industrial scale of pulp and paper manufacturing processes. Furthermore, nitrogen purging is costly.

In one embodiment, the oxygen concentration in the oxygen reduced environment is reduced with at least 50%, such as at least 75%, such as at least 80%, such as at least 85%, such as at least 90%, such as at least 96%, such as at least 97%, such as at least 98% or such as at least 99% compared to the oxygen concentration in air.

In one embodiment, about 1%, such as about 2%, such as about 5%, such as about 10%, or such as about 15% of oxygen is present in the oxygen reduced environment.

In one embodiment, there is provided a method wherein the redox initiator is selected from the group consisting of hydrogen peroxide, peracetic acid, 2-hydroperoxy-1,4-dioaycyclohexane, 3,3-dimethyl-1,2-dioxybutane, 1-hydroperoxybenzene, 1-(2-hydroperoxypropyl)benzene, and anhydrous solid peroxides, such as magnesium peroxyphthalate, sodium peroxyborate and sodium percarbonate, and periodate based oxidant. In one example, the redox initiator is a peroxide based redox initiator. In one particular embodiment, said redox initiator is $H_2O_2$. Hydrogen peroxide is a commonly used bleaching chemical in pulp and paper industry and is commercially easily available.

In some embodiments, other radical initiators may be used. For example ceric ammonium nitrate, Co (III) acetylacetonate complex, other $Cu^{2+}/IO^{4-}$ couples (such as potassium diperiodatocuprate (III) and the like) may be used.

In yet other embodiments, a co-initiator may be used in conjunction with a redox initiator. The co-initiator used in the copolymerization process is a reductant agent. As an example, iron (II) could be used for this purpose. Copper, manganese, chromium, vanadium or any other cation able to carry out oxidation-reduction reactions with the initiator could likewise be used. The initiation process may be speed up by using acids that are able to dissociate into radicals, such as sulphuric acid or nitric acid. The co-initiators, such as iron (II), may not need to be added to the process since iron often exists in wood chips.

In some examples, depending on wood species and their extractive content, especially tropical hardwood species with a high content of extractive substances, EDTA, DTPA or other metal chelating agents may be added in pre-treatment steps of wood chips in order to wash out the detrimental extractives. In some cases, some transitional metal ions, such as ferrous ions, need to the added before or simultaneously with addition of hydrogen peroxide in order to initiate the radical grafting reactions.

The method described herein may further comprise a pH regulating agent, such as sodium hydroxide. The pH regulating agent may be provided together with the redox initiator. It is believed that the formation of lignin and/or cellulose macroradicals is favorably formed at a neutral pH, such as in the range of 6-8, such as in the range of 6-7. The pH regulating agent may be added in an amount in the range of 0.5-10 wt %, such as 0.7-5 wt %, such as 0.8-2 wt %, based on bone-dry wood. The pH regulating agent may cause the pH in the refiner to be in the range of 6-8, such as in the range of 6-7, or such as about 6.5.

As explained herein, the lignin and/or cellulose radicals (also referred to as macroradicals) are generated under mechanical impact in the present method. It is believed that mechanical impact generates macroradicals through homolytic cleavage of both lignin and/or cellulose structures leading to formation of lignin and/or cellulose macroradicals, which may react with present monomers and/or polymers. In one embodiment, said mechanical impact is grinding, milling, and/or refining. The mechanical impact has to be sufficient to generate said macroradicals. The mechanical impact may be quantified by the specific electric energy consumption in the refining motors. By varying the specific energy consumption, the mechanical impact may be varied. Thus, in one embodiment, said mechanical impact is performed under a pressure in the range of 1-7 bars, at a temperature in the range of 70-180° C., and with a specific energy consumption of 300-2900 kWh/BDT (bone-dry ton). In another example, the mechanical impact is performed under a pressure in the range of 6-7 bars and a temperature in the range of 150-170° C. In yet another example, the specific energy consumption is in the range of 300-2900 kWh/BDT, such as 500-2000 kWh/BDT, such as 800-1500 kWh/BDT.

The skilled person will appreciate that any kind of alkyl, aryl, vinyl, allyl types or any double bond or triple bond containing molecules may be used as monomers in the context of the present method, provided that it may be polymerized through radical polymerization. Non-limiting examples of such monomers include acrylamide, methyl acrylate, butyl acrylate, 4-vinylpyridine, acrylic acid, dimethylaminoethyl methacylate, acrylonitrile and butyl methacrylate, and any combination thereof. Also, molecules for example macromolecules that can polymerize in situ are suitable as monomers in the invention. Acrylates, styrenes or butadienes are examples of possible monomers.

Thus, according to the present disclosure, there is provided a method wherein the monomers used have at least one double or triple bond. In one embodiment, said monomer is an alkyl, aryl vinyl or allyl.

In one embodiment, said monomer is selected from the group consisting of acrylamide, methyl acrylate, butyl acrylate, 4-vinylpyridine, acrylic acid, dimethylaminoethyl methacylate, acrylonitrile and butyl methacrylate, and any combination thereof. In one embodiment, said monomer is an acrylate, a styrene or a butadiene.

In one embodiment, said monomer is a vinyl monomer. In one embodiment, said vinyl monomer is selected from the group consisting of methyl methacrylate, butyl methacrylate, glycidyl methacrylate, acrylamide, methyl acrylate, butyl acrylate, 4-vinylpyridine, acrylic acid, dimethylaminoethyl methacylate, acrylonitrile and butyl methacrylate, and any combination thereof.

The monomers may be alkenes or alkynes of the general structure:

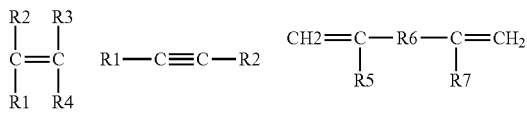

where $R_i$, wherein i=1, 2, 3, 4, 5, 6, or 7, is an organic or inorganic functional group which does not interfere with free radical polymerization, often chosen from among 1) hydrogen; 2) a halogen; 3) the group consisting of an organic acid, an organic alcohol, an aldehyde, an alkane, an alkene, an alkyne, an amide, an aromatic, a cycloalkane, an ester, an ether, an organic halogen, a ketone, an organic nitrile, a phenol, an organophosphate, and an organic sulfonic acid; 4) the group specified at 3) substituted in at least one, tetravalent carbon atom by a divalent heteroatom with the atomic symbol S, Se, Te, Si, Ge, Sn, or Pb, a trivalent heteroatom with the atomic symbol N, P, As, Sb, Bi, or B, or a tetravalent heteroatom with the atomic symbol 5, Se, Te, Si, Ge, Sn, or Pb; and 5) the structures of groups 3) and 4) further substituted by members of such groups. Non-limiting examples of such monomers include: 1-chloroethene; 1,1,2,2-tetrafluoroethene; 1-phenylethene; 1,2-diphenylethene (stilbene); 1-(j-halophenyl)ethene where j is 2, 3, or 4 and the halide substituent is fluorine, chlorine, or bromine; 1,k-diethenylbenzene or k-ethenylpyridine, where k=2, 3, or 4; 1,3-butadiene; 3-buten-2-one; 2-thio-3-butene; 2-methyl-1,3-butadiene; 2-chloro-1,3-butadiene; 2-propenoic acid; 2-propen-1-al (acrolein); 2-propene nitrile; 2-methyl-2-propenoic acid; 1,1-dichloroethene; 1,2-dichloroethene; 2-propenamide; N,N-dimethyl-2-propenamide; N,N-bis(2-propenamido)methane; 1-methyl-1-phenylethene; 2-oxo-3-oxypent-4-ene; a 2-methyl-3-oxo-4-oxybut-1-ene-(p-ethoxy-(3*p+3)-ol where p varies from 1 to 300,000; 2-methyl-2N-propenamidopropane sulfonic acid which is neutralized with one or more cations chosen from among hydrogen, lithium, sodium, potassium, ammonium, zinc, magnesium, or calcium; dimethyldiprop-2-enylammonium chloride; (3-oxy-4-oxo-5-methylhex-5-enyl)trimethylammonium methylsulfate; (3-oxy-4-oxo-5-methylhex-5-enyl) trimethylammonium chloride; 2-oxy-3-oxopent-4-ene; 4-methyl-2-oxy-3-oxopent-4-ene; propene; ethene sulfonic acid; and ethene. In the name 2-methyl-3-oxo-4-oxybut-1-ene-(p-ethoxy-(3*p+3)-ol, p is an integer greater than 0 and denotes the number of ethoxy groups, —O—$CH_2$—$CH_2$—, in the alkoxy chain attached to the organic acid group. Specifically monomers, such as styrene-butadiene, isoprene, chloroprene, α-pinene, and β-pinene, may provide elastic functionalities to the lignin and/or cellulose containing material.

In one embodiment, the monomers are selected from the group consisting of styrene butadiene, isoprene, chloroprene, methyl methacrylate, and methacrylate, and any combination thereof.

According to the present disclosure, grafting may also occur between added polymers and the lignin and/or cellulose backbone. The added polymers may be converted to macroradicals under mechanical impact and be grafted with the lignin and/or cellulose macroradicals in the backbone.

According to the present disclosure, any polymer which may form macroradicals under mechanical impact can be grafted to the lignin and/or cellulose backbone. Polymers having reactive groups prone to peroxide based initiators to generate radicals may also be used as added polymers to be grafted to the backbone of the lignin and/or cellulose. The polymers can be chosen depending on the desired functionalities of the resulting grafted materials.

According to the present disclosure, the added polymers may be polymerized monomers.

In other examples, the added polymers may be derived from natural biodegradable resources.

In one embodiment, the added polymers contain electron rich carbon-carbon double bonds. It is believed that the double bonds are easily attacked by lignin and/or cellulose radicals. Thus, the polymers may easily be grafted to the macroradicals of lignin and/or cellulose.

In one embodiment, the added polymers are carbon-carbon double bond containing natural polymers, for example vegetable oils containing polyunsaturated fatty acids, such as α-linolenic acid. Other examples are corn oil, sunflower oil and flax seed oil.

In one embodiment, the polymers are selected from the group consisting of polyisoprene, polychloroprene, polybutadiene, and polystyrene butadiene. These polymers may make the wood fibers and/or defiberated wood fibers more plastic. In one embodiment, the added polymer is polystyrene butadiene.

In one embodiment, polyvinyl chloride (PVC), polypropylene (PP) or polyethylene (PE) may be used as added polymer.

In one embodiment, styrene butadiene based latex emulsion, such as polystyrene butadiene, styrene acrylate based latex emulsion, such as copolymer styrene butyl acetate (i.e. poly(styrene-co-butyl acrylate)), and/or vinyl acetate based latex emulsion, such as poly(vinyl acetate-co-ethylene), may be used as added polymer.

In one embodiment, the monomers and/or polymers are added to the lignin and/or cellulose containing material in an amount of in the range of 5-20 wt %, such as 5-15 wt %, such as 6-12 wt %, such as 8-10 wt %, based on bone-dry wood. In another embodiment, the monomers and/or polymers are charged to the wood chips and/or defiberated wood chips with an amount of about 6 wt %, about 8 wt %, or about 12 wt %, based on bone-dry wood.

In one embodiment, there is provided a method as disclosed herein, wherein additional macroradicals are generated by subjecting the lignin and/or cellulose containing material to the redox initiator. Thus, the redox initiator may generate macroradicals on its own or in combination with mechanical impact.

In one embodiment, there is provided a method as disclosed herein, wherein the monomers and/or polymers are grafted to the backbone of the lignin and/or cellulose of said lignin and/or cellulose containing material where the macroradicals are formed.

It will be appreciated that the lignin and/or cellulose containing material may be subjected to monomers and/or polymers at various steps during the mechanical pulp manufacturing process.

Briefly, a typical mechanical pulp manufacturing process is illustrated in FIG. 1. The skilled person is familiar with mechanical pulp manufacturing processes. In general, mechanical pulp refining processes are often preceded by some kind of wood chip pre-treatment, such as steaming, washing, pre-chemical impregnation/treatment and recently also mechanical pre-treatment via for example Andritz MSD impressafiner, or Valmet Prex plug screw, with or without chemicals added. The main function of the mechanical pre-treatment is to deform and compress wood chips so that deformed compressionally de-structured wood chips with partially open structures are obtained to facilitate the subsequent refining.

As used herein, the term "partially open structures" refers to wood chips being opened with new generated surface.

In this stage the specific energy consumption is low at a typical level of approximately 10-40 kWh/BDT with a temperature range of 50-180° C. (regulated by pre-steaming temperature and pretreatment pressure) and treatment time often in a few seconds.

The chemical pre-treatment is often performed to remove the detrimental substances, such as resinous extractive substances in the woods, and to allow the chemicals to react mainly with the lignin structures and to soften the lignin macromolecules for the purpose of facilitating the defiberation process in refining. In the case of alkaline hydrogen peroxide mechanical pulping processes, the $H_2O_2$ pre-treatment also serves the purpose of bleaching in order to increase the brightness of the pulps. The typical chemical dosage of hydrogen peroxide is in a range of 1-5 wt % $H_2O_2$ based on bone-dry wood, alkali addition is in the range of 0.5-5 wt % based on bone-dry wood (depending on wood species, such as soft wood or hardwood). The term "bone-dry wood" as used herein refers to wood from which no moisture can be removed when exposed to a temperature of 100° C.

According to the present invention, the hydrogen peroxide may be sprayed onto the wood chips and/or defiberated wood chips. In other examples, the hydrogen peroxide is added in the impregnation vessel after the chip compression stage. In yet other examples, the hydrogen peroxide is added in the refiner eye. Furthermore, the hydrogen peroxide may be added after refining in the pulp latency chest.

According to the present disclosure, in some embodiments, the chemical dosage of hydrogen peroxide is in the range of 1-15 wt %, such as 2-10 wt %, such as 2-8 wt %, such as 2-5 wt %, such as 2-4 wt %, or such as 2.5-4 wt %, based on bone-dry wood. In yet other examples, the chemical dosage of hydrogen peroxide is about 1 wt %, such as about 2 wt %, such as about 2.5 wt %, such as about 3 wt %, such as about 4 wt % or such as about 5 wt %, based on bone-dry wood. In yet other examples, the chemical dosage of hydrogen peroxide is 6-8 wt %, based on bone-dry wood.

According to the present disclosure, in some embodiments, the alkali addition is in the range of 0.5-6 wt %, such as 1-4 wt %, or such as 2-3 wt %, based on bone-dry wood. In yet other examples, the alkali addition is about 0.8 wt %, such as about 1 wt %, such as about 2 wt %, such as about 2.5 wt %, such as about 3 wt %, such as about 4 wt %, such as about 5 wt %, such as about 6 wt %, or such as about 8 wt %, based on bone-dry wood.

According to the present disclosure, the redox initiator, such as hydrogen peroxide, promotes formation of hydroxyl radicals. Hydroxyl radical is a strong oxidant in aqueous media which easily binds to lignin and/or cellulose forming lignin and/or cellulose radicals. It is believed that these radials may react favorably with carbon-carbon double bond(s) of added monomers and/or polymers, thus completing the grafting reaction. The presence of transitional metal ions may be favorable for the formation of hydroxyl radicals.

Commonly, in e.g. normal alkaline peroxide mechanical pulping processes, the treatment is often performed under alkaline conditions, and in these cases some hydrogen peroxide stabilizers, such as silicate or magnesium sulfate, are added. Furthermore, transition metal chelating agents, such as EDTA or DTPA, may also be added. The treatment temperature is often controlled at a temperature below 90° C. to avoid the decomposition of hydrogen peroxide.

Another commonly used chemical pre-treatment is by using sulfite. In these cases a sulfite charge in the range of 1-5 wt % $Na_2SO_3$ based on bone-dry wood, with alkali addition in the range of 0-5 wt % based on bone-dry wood, and pre-treatment time of a few minutes at a temperature of 60-120° C. are used.

According to the present disclosure, in some embodiments, the charge of $Na_2SO_3$ is in the range of 2-5 wt %, such as 2-4 wt %, or such as 2.5-4 wt %, based on bone-dry wood. In yet other examples, the charge of $Na_2SO_4$ is about 1 wt %, such as about 2 wt %, such as about 2.5 wt %, such as about 3 wt %, such as about 4 wt % or such as about 5 wt %, based on bone-dry wood.

According to the present disclosure, in some embodiments, the alkali addition is in the range of 1-4 wt %, or such as 2-3 wt %, based on bone-dry wood. In yet other examples, the alkali addition is about 1 wt %, such as about 2 wt %, such as about 2.5 wt %, such as about 3 wt %, such as about 4 wt % or such as about 5 wt %, based on bone-dry wood.

The present disclosure describes that for the purpose of monomer and/or polymer grafting, monomers and/or polymers are added in the chemical pre-treatment stage, alone or together with redox initiators, such as peroxide based initiators (for example hydrogen peroxide) so that some degree of pre-mixing of the wood chips with these monomers and/or polymers occurs already at the pre-treatment stage before refining.

In the case of sulfite, due to the reductive nature of sulfite, a separate hydrogen peroxide pre-treatment stage together with monomers and/or polymers is preferred.

After the wood chip pre-treatment, the impregnated wood chips are transferred into the primary refining stage, often via means of a plug screw where wood chips are further compressed and most of the liquid content removed. It is envisioned that commercially available refiners from equipment suppliers such as Andritz or Valmet are used. These refiners may be single or double disc refiner with pressure often run at 2-6 bars and at a temperature of 120-180° C., such as 150-170° C. and in particular 157-168° C., for a typical thermomechanical pulping process.

By pre-steaming wood chips, the air present in the wood chips is depleted by the saturated steams. Further in the refiner itself, chip compression in combination with high steam pressure leads to an oxygen deficient, or at least oxygen reduced, environment which is desirable for the radical grafting reactions. The mechanical energy input at the refining stage is normally measured as specific energy consumption, and a range from 600 kWh/BDT to 2700 kWh/BDT is normally applied depending on the refining degree required for the fiber property development.

The primary refined wood fibers, in some embodiments, continue into a secondary stage refining to further refine the fibers, and in some embodiments, the primary stage refined wood fibers would go further to cleaning and screening stage for removal of rejected material and handling.

In other examples, the primary refined wood fibers continue to a drying stage. After the drying stage, the primary refined wood fibers are compounded, with or without additional matrix polymers, in order to form granulates.

Wood chips are defiberated and refined in the refiner and the refiner itself is a very efficient mixing device allowing more complete penetration of the added monomers and/or polymers to the lignin and/or cellulose macroradicals, which are generated in situ on lignin and/or cellulose backbone structures by the mechanical energy and/or impact.

It is desirable that the monomers and/or polymers and the wood chips and/or defiberated wood chips are well mixed such that they are well distributed across the bulk of wood chips and/or defiberated wood chips so that the grafting reaction occurs close to essentially or essentially uniformly across the bulk of wood chips and/or defiberated wood chips. It is also desirable that the redox initiator is well distributed across the bulk of wood chips and/or defiberated wood chips to initiate the grafting reaction.

For example, said monomers and/or polymers may be added to the wood chips and/or defiberated wood chips during a wood chip pre-treatment step. It will furthermore be appreciated that said monomers and/or polymers may be added before, simultaneously with or after the addition of a redox initiator. For example, said redox initiator may be added during an earlier step, during the same step or immediately after addition of monomers and/or polymers in the pulping process as shown in the appended FIGS. 2-4.

Thus, in one embodiment there is provided a method as disclosed herein, wherein the lignin and/or cellulose containing material is subjected to monomers and/or polymers during a wood chip pre-treatment step. For example, the monomers and/or polymers may be added during a wood chip pre-treatment step. It is possible that the pre-treatment of the wood chips is carried out in more than one, such as two or three or more, separate pre-treatment steps depending on the properties of the wood chips. Said more than one separate pre-treatment steps may be performed in different reaction vessels or in the same reaction vessel. In one embodiment of the present method, the lignin and/or cellulose containing material is subjected to at least one pre-treatment step, such as at least two pre-treatment steps, such as three pre-treatment steps. Thus, said lignin and/or cellulose containing material may be subjected to monomers and/or polymers in at least one pre-treatment step, such as at least two pre-treatment steps, such as three pre-treatment steps or all pre-treatment steps.

Additionally or alternatively, it is also possible that said monomers and/or polymers are added to defiberated wood chips during a refining step as illustrated in FIGS. 2-4. Thus, in one embodiment the lignin and/or cellulose containing material is subjected to monomers and/or polymers during a wood chip primary and/or wood chip secondary refining step.

It is also envisioned that the lignin and/or cellulose containing material is subjected to monomers and/or polymers during both pre-treatment step(s) and refining step(s).

In another example, the lignin and/or cellulose containing material is subjected to monomers and/or polymers during a latency chest step.

In embodiments of the method as disclosed herein, wherein lignin and/or cellulose containing material is subjected to alkaline peroxide mechanical pulping, it is envisioned that the lignin and/or cellulose containing material may be subjected to monomers and/or polymers at different steps in said process as illustrated in FIGS. 2a and 2b. For example, said monomers and/or polymers may be added at different steps in said process. Thus, in one embodiment of the method disclosed herein, the lignin and/or cellulose containing material is subjected to monomers and/or polymers during a wood chip pre-treatment step, a primary refining step, a secondary refining step and/or a latency chest step in an alkaline peroxide mechanical pulping process. In another embodiment of said method, the lignin and/or cellulose containing material is subjected to monomers and/or polymers during a wood chip pre-treatment step, a primary refining step, and/or secondary refining step in an alkaline peroxide mechanical pulping process. In another embodiment of said method, the lignin and/or cellulose containing material is subjected to monomers and/or polymers during a wood chip pre-treatment step and/or a refining step in an alkaline peroxide mechanical pulping process. In another embodiment of said method, the lignin and/or cellulose containing material is subjected to monomers and/or polymers during a wood chip pre-treatment step in an alkaline peroxide mechanical pulping process. In another embodiment, the lignin and/or cellulose containing material is subjected to monomers and/or polymers during a refining step in an alkaline peroxide mechanical pulping process.

Addition of monomers and/or polymers in wood chip pre-treatment stage(s) makes good mixing of monomers with wood chips already before the refining stage, which may promote more uniform grafting. Addition of monomers/polymers directly in the refiner may make immediate grafting reactions possible under intensive mechanical impact. Furthermore, as disclosed herein, monomers and/or polymers maybe added in both pre-treatment stage(s) and refining stage(s) and this provides good grafting reactions.

In embodiments of the method as disclosed herein, wherein lignin and/or cellulose containing material is subjected to thermomechanical pulping, it is envisioned that the lignin and/or cellulose containing material may be subjected to monomers and/or polymers at different steps in said process as illustrated in FIGS. 3a and 3b. For example, said monomers and/or polymers may be added at different steps in said process. Thus, in one embodiment of the method disclosed herein, the lignin and/or cellulose containing material is subjected to monomers and/or polymers during a wood chip pre-steaming step, a wood chip pre-treatment step, a primary refining step, a secondary refining step and/or a latency chest step in a thermomechanical pulping process. In another embodiment of said method, the lignin and/or cellulose containing material is subjected to monomers and/or polymers during a wood chip pre-steaming step, a wood chip pre-treatment step, a primary refining step, and/or a secondary refining step in a thermomechanical pulping process. In another embodiment of said method, the lignin and/or cellulose containing material is subjected to monomers and/or polymers during a wood chip pre-treatment step, a primary refining step, and/or a secondary refining step in a thermomechanical pulping process. In another embodiment of said method, the lignin and/or cellulose containing material is subjected to monomers and/or polymers during a wood chip pre-steaming step in a thermomechanical pulping process. In another embodiment of said method, the lignin and/or cellulose containing material is subjected to monomers and/or polymers during a wood chip pre-treatment step in a thermomechanical pulping process. In another embodiment, the lignin and/or cellulose containing material is subjected to monomers and/or polymers during a refining step in a thermomechanical pulping process. The wood chips are defiberated and refined in the refiner and during refining very efficient conditions for mixing occurs, whereby the added monomers and/or polymers are mixed with the lignin and/or cellulose containing material. This makes the monomers and/or polymers accessible for reacting with the in situ generated macroradicals of lignin and cellulose backbone structures.

In embodiments of the method as disclosed herein, wherein lignin and/or cellulose containing material is subjected to chemithermomechanical pulping, it is envisioned that the lignin and/or cellulose containing material may be subjected to monomers and/or polymers at different steps in said process as illustrated in FIGS. 4a and 4b. For example, said monomers and/or polymers may be added at different steps in said process. Thus, in one embodiment of the method disclosed herein, the lignin and/or cellulose containing material is subjected to monomers and/or polymers during a wood chip pre-impregnation with sulfite step, a wood chip pre-treatment step, a primary refining step, a secondary refining step and/or a latency chest step in a chemimechanical pulping process. In one embodiment of said method, the lignin and/or cellulose containing material is subjected to monomers and/or polymers during a wood chip pre-impregnation with sulfite step, a wood chip pre-treatment step, a primary refining step and/or a secondary refining step in a chemimechanical pulping process. In one embodiment of said method, the lignin and/or cellulose containing material is subjected to monomers and/or polymers during a wood chip pre-treatment step, a primary refining step and/or a secondary refining step in a chemimechanical pulping process.

In one embodiment of said method, the lignin and/or cellulose containing material is subjected to monomers and/or polymers during a wood chip pre-impregnation with sulfite step in a chemimechanical pulping process. In one embodiment of said method, the lignin and/or cellulose containing material is subjected to monomers and/or polymers during a wood chip pre-treatment step in a chemimechanical pulping process. In one embodiment of said method, the lignin and/or cellulose containing material is subjected to monomers and/or polymers during a refining step in a chemimechanical pulping process.

In another embodiment of said method, the lignin and/or cellulose containing material is subjected to monomers and/or polymers during a wood chip pre-steaming step in a chemimechanical pulping process. In another embodiment of said method, the lignin and/or cellulose containing material is subjected to monomers and/or polymers during a wood chip pre-treatment step in a chemimechanical pulping process. In another embodiment, the lignin and/or cellulose containing material is subjected to monomers and/or polymers during a refining step in a chemimechanical pulping process.

It will be appreciated that the step of subjecting said lignin and/or cellulose containing material to monomers and/or polymers may be performed by addition of said monomers and/or polymers to the lignin and/or cellulose containing material during the given process step. For the sake of brevity, the above section will not be repeated here in the context of addition of monomers and/or polymers, however the skilled person will appreciate that the above description is equally relevant to embodiments wherein said subjecting is performed by addition of monomers and/or polymers. Thus, in one embodiment there is provided a method as disclosed herein, wherein the monomers and/or polymers are added to the lignin and/or cellulose containing material during a wood chip pre-treatment step. In one embodiment of the present method, the monomers and/or polymers are added to the lignin and/or cellulose containing material during at least one pre-treatment step, such as at least two pre-treatment steps, such as three pre-treatment steps.

It is also possible that said monomers and/or polymers are added to defiberated wood chips during a refining step as illustrated in FIGS. 2-4. Thus, in one embodiment the monomers and/or polymers are added to lignin and/or cellulose containing material during a primary refining step and/or secondary refining step.

It is also envisioned that the monomers and/or polymers are added to lignin and/or cellulose containing material during both pre-treatment step(s) and refining step(s).

In another example, the monomers and/or polymers are added to lignin and/or cellulose containing material during a latency chest step.

Thus, in one embodiment of the method disclosed herein, the monomers and/or polymers are added to lignin and/or cellulose containing material during a wood chip pre-treatment step, a primary refining step, a secondary refining step and/or a latency chest step in an alkaline peroxide mechanical pulping process. In another embodiment of said method, the monomers and/or polymers are added to lignin and/or cellulose containing material during a wood chip pre-treatment step, a primary refining step, and/or secondary refining step in an alkaline peroxide mechanical pulping process. In another embodiment of said method, the monomers and/or polymers are added to lignin and/or cellulose containing material during a wood chip pre-treatment step and/or a refining step in an alkaline peroxide mechanical pulping process.

In another embodiment of said method, the monomers and/or polymers are added to the lignin and/or cellulose containing material during a wood chip pre-treatment step in an alkaline peroxide mechanical pulping process. In another embodiment, the monomers and/or polymers are added to the lignin and/or cellulose containing material during a refining step in an alkaline peroxide mechanical pulping process. Addition of monomers and/or polymers in wood chip pre-treatment stage makes better mixing of monomers and/or polymers with wood chips already before refining which may facilitate more uniformed grafting.

In one embodiment of the method disclosed herein, the monomers and/or polymers are added to the lignin and/or cellulose containing material during a wood chip pre-steaming step, a wood chip pre-treatment step, a primary refining step, a secondary refining step and/or a latency chest step in a thermomechanical pulping process. In another embodiment of said method, the monomers and/or polymers are added to the lignin and/or cellulose containing material during a wood chip pre-steaming step, a wood chip pre-treatment step, a primary refining step, and/or a secondary refining step in a thermomechanical pulping process. In another embodiment of said method, the monomers and/or polymers are added to the lignin and/or cellulose containing material during a wood chip pre-treatment step, a primary refining step, and/or a secondary refining step in a thermomechanical pulping process. In another embodiment of said method, the monomers and/or polymers are added to the lignin and/or cellulose containing material during a wood chip pre-steaming step in a thermomechanical pulping process. In another embodiment, the monomers and/or polymers are added to the lignin and/or cellulose containing material during a wood chip pre-treatment step in a thermomechanical pulping process. In another embodiment, the monomers and/or polymers are added to the lignin and/or cellulose containing material during a refining step in a thermomechanical pulping process.

In another embodiment of the method disclosed herein, the monomers and/or polymers are added to the lignin and/or cellulose containing material during a wood chip pre-impregnation with sulfite step, a wood chip pre-treatment step, a primary refining step, a secondary refining step and/or a latency chest step in a chemimechanical pulping process. In one embodiment of said method, the monomers and/or polymers are added to the lignin and/or cellulose containing material during a wood chip pre-impregnation with sulfite step, a wood chip pre-treatment step, a primary refining step and/or a secondary refining step in a chemimechanical pulping process. In one embodiment of said method, the monomers and/or polymers are added to the lignin and/or cellulose containing material during a wood chip pre-treatment step, a primary refining step and/or a secondary refining step in a chemimechanical pulping process.

In one embodiment of said method, the monomers and/or polymers are added to the lignin and/or cellulose containing material during a wood chip pre-impregnation with sulfite step in a chemimechanical pulping process. In one embodiment, the monomers and/or polymers are added to the lignin and/or cellulose containing material during a wood chip pre-treatment step in a chemimechanical pulping process. In one embodiment the monomers and/or polymers are added to the lignin and/or cellulose containing material during a refining step in a chemimechanical pulping process.

In another embodiment the monomers and/or polymers are added to the lignin and/or cellulose containing material during a wood chip pre-steaming step in a chemimechanical pulping process. In another embodiment of said method, the monomers and/or polymers are added to the lignin and/or cellulose containing material during a wood chip pre-treatment step in a chemimechanical pulping process. In yet another embodiment, the monomers and/or polymers are added to the lignin and/or cellulose containing during a refining step in a chemimechanical pulping process.

According to the present disclosure mechanical refining is performed under pressure, in the range of 1-7 bars, for more efficient oxygen depletion and for softening lignin macromolecules. Also, refining temperature above lignin softening temperature in the range of 120-170° C. is preferably used. Thus, in one embodiment of the method disclosed herein, the pressure in the refining step is in the range of 1-7 bars. Wherein thermomechanical or chemimechanical pulp manufacturing processes are used, it is beneficial that the pressure in the refining step is in the range of 6-7 bars. Thus, in one embodiment, said pressure in the refining step is in the range of 6-7 bars, such as in the refining step of a thermomechanical or chemimechanical pulp manufacturing process. The high temperature applied is beneficial for fiber property development and for lower energy consumption in the refining stage. This high refining temperature is above the lignin glass transition temperature and makes the lignin macromolecules more movable during the refining process so that the radical grafting reaction is favored.

In another embodiment, the pressure in the refining step is about 1 bar, such as in the refining step of an alkaline peroxide mechanical pulp manufacturing process. This is in line with the common practices of the alkaline peroxide mechanical pulping process conditions mainly for the purpose of favorable bleaching response.

It is also advantageous that the temperature in the refining step is above lignin softening temperature, which is about 120-170° C.; however temperatures in the range of 90-190° C. may be used. Thus, in one embodiment of the method as disclosed herein, the temperature in the refining step is in the range of 90-190° C., such as in the range of 90-170° C., such as in the range of 120-170° C., such as in the range of 150-170° C.

In one embodiment of the method disclosed herein, the thermomechanical refining conditions are 2-7 bars pressure and 120-170° C. The high refining temperature of 120-170° C. is above the lignin glass transition temperature and the temperature makes the lignin macromolecules more movable during the refining step, whereby the radical grafting reaction is favored.

For some of the alkaline peroxide mechanical pulping processes, the primary refining stage is performed at atmospheric pressure (1 bar) to obtain good bleaching response as mentioned above. In this case, it is advantageous to have a pre-steaming of the wood chips in order to deplete the air (and thus oxygen) present in the wood chips before refining.

It is also possible to add the monomers in the refiner stage or directly after the refiner stage where the oxygen-deficient environment is still prevailing.

According to the present disclosure, pulp may be used instead of wood chips. The pulp preferably has a high consistency of above 30-40%. The pulp may be fed directly into a refiner, through e.g. a pressured plug screw and then be refined at a pressure higher than atmospheric pressure to ensure an oxygen-deficient environment. Monomers and/or polymers and redox initiator, such as $H_2O_2$, and optionally $FeSO_4$, may be charged either before the refiner or in the refiner through refiner eye(s) to allow the grafting reaction to occur.

In another aspect of the present disclosure there is provided a grafted copolymer of lignin and/or cellulose, which material is obtainable by the method as described herein. The copolymer obtainable by the method described herein is a so-called graft copolymer in which the copolymer backbone comprises or consists of lignin and/or cellulose and monomer(s) and/or polymer(s) are grafted to said backbone by covalent bonding. In this document, the terms "grafted copolymer" and "graft copolymer" are used interchangeably.

The grafted copolymers comprise a lignin and/or cellulose backbone with grafted functional monomer and/or polymer units. For example, the monomer units may undergo polymerization to become polymer units grafted on said backbone. These functional units provide the desired properties, such as hydrophobicity, elasticity, three dimensional formability and/or fire retardancy, to the lignin and/or cellulose. For example, the grafted copolymer of lignin and/or cellulose may be obtained by grafting any kind of alkyl, aryl vinyl, allyl types or any double bond or triple bond containing molecules. Any kind of alkyl, aryl vinyl, allyl types or any double bond or triple bond containing molecules maybe used as monomers in the context of the present method, provided that it can be polymerized through radical polymerization. Thus, the resulting material comprises a lignin and/or cellulose backbone and a monomer and/or polymer grafted on said backbone through a covalent bond.

Furthermore, it is an advantage of the present material that it is biodegradable and thus environmentally friendly by virtue of being based of lignin and/or cellulose.

Examples of such materials, include but are not limited to copolymers comprising a lignin and/or cellulose backbone and a grafted polymer derived from polymerized monomers, such as monomers selected from the group consisting of acrylamide, methyl acrylate, butyl acrylate, 4-vinylpyridine, acrylic acid, dimethylaminoethyl methacylate, acrylonitrile and butyl methacrylate, and any combination thereof. Other examples include copolymers comprising a lignin and/or cellulose backbone and a grafted polymer derived from polymerized monomers, such as monomers selected from the group consisting of acrylates, styrenes and butadienes. Yet other examples include copolymers comprising a lignin and/or cellulose backbone and a grafted polymer derived from polymerized monomers, such as monomers selected from the group consisting of alkyls, aryl vinyls or allyls. Further examples include copolymers comprising a lignin and/or cellulose backbone and a grafted polymer derived from polymerized monomers, such as vinyl monomers, such as vinyl monomers selected from the group consisting of methyl methacrylate, butyl methacrylate, glycidyl methacrylate, acrylamide, methyl acrylate, butyl acrylate, 4-vinylpyridine, acrylic acid, dimethylaminoethyl methacylate, acrylonitrile and butyl methacrylate, and any combination thereof.

In other examples, copolymers comprising a lignin and/or cellulose backbone and a grafted polymer derived from natural biodegradable resources are utilized.

Furthermore, it is envisioned that said grafted copolymer may be combined with a second, complementary material to produce a composite material. A composite material (also called a composition material or shortened to composite) is a material made from two or more constituent materials with significantly different physical or chemical properties that, when combined, produce a material with characteristics different from the individual components. The individual components remain separate and distinct within the finished structure.

Thus, in another aspect of the present disclosure there is provided a composite material comprising at least one grafted copolymer as disclosed herein. Said composite material is envisioned to comprise a second, complementary material. Non-limiting examples of second, complementary materials include polyolefins or any other synthetic or natural occurring polymers which may interact with the grafted copolymer. The second, complementary material may be selected to confer further desirable properties to said composite material, alone or in combination with said grafted copolymer. Examples of such properties include may include hydrophobicity, elasticity, mechanical strength, barrier properties, fire retardancy, electrical conductivity, heat and sound isolation and other.

Thus, in one embodiment said composite material comprises a second, complementary material, such as a material selected from the group consisting of biopolymers, for example biopolymers selected from poly(hydroxyl butyrate), biopolymers of the alkanoates family, poly(lactic acid) and polyolefins, such as poly(ethylene) or poly(propylene). In one embodiment, said second, complementary material is polyolefin, such as poly(ethylene) or poly(propylene).

The composite material may comprise the grafted copolymer and polymer matrix, or they could be foamed materials where the grafted copolymer is used to reinforce and functionalize the product. The composite could also be a laminate structure. Composites can comprise modified hydrophobic grafted copolymers as disclosed herein and a biopolymer, e.g. poly(hydroxyl butyrate) or, in general, the alkanoates family, and poly(lactic acid); a polyolefin, e.g. poly(ethylene) or poly(propylene).

Composites may be used to create low or ultra-low density materials for insulation, roof tiles, exterior cladding, or multi-functional panels. It could also be used for automotive parts or other building products that require a limited load-bearing capacity. Other examples include structural composites for construction and automotive applications. Non-structural biocomposites may include such applications as automotives (interior, floor mats, etc.) and construction (e.g. insulation). The hydrophobic grafted copolymers may further enhance the barrier performance of the packaging material against moisture or water vapour.

Composite materials may be produced by a variety of techniques, such as moulding. Within a mold, the materials are combined, compacted, and cured (processed) to undergo a melding event. After the melding event, the part shape is essentially set, although it may deform under certain process conditions. A skilled person in the art is familiar with methods for moulding of lignin and/or cellulose containing material.

As illustrated in FIG. 5 and in FIG. 7, the obtained grafted lignin and/or cellulose material may be subjected to further treatments. It may be dried, and then further compounded, to obtain a powder or granulate which is suitable for injection or compression moulding. Alternatively, second, complementary material(s), such as plastic granulates, such as polyethylene (PE) or polypropylene (PP), may be added to said material to obtain a composite material. Optionally, the plastic granulates may also be added before drying to form powder/granulate. It will be understood that one or several types of second, complementary material(s) may be added to one individual batch of the grafted lignin and and/or cellulose containing material. After further process steps of treatment in a paper machine, said composite material may be used to obtain 3-D formable paper or board (cardboard) or fiber mats for biocomposite applications. Furthermore, said materials may be used to obtain products in the area of construction, packaging, furniture, transportation, household items, sportswear, automobile parts, marine equipment as well as any application areas wherein plastic polymers are used today.

Thus, in another aspect of the present disclosure, there is provided a use of grafted copolymer of lignin and/or cellulose for applications in the area of construction, packaging, furniture, transportation, household items as well as any application areas wherein plastic polymers are used today, such as for applications in construction, packaging, furniture, household products, sportswear, automobile parts, marine equipment (e.g. boats) or in any cellulosic fiber based composite materials.

It will be appreciated that also said composite material comprising grafted polymers may be used, for example for applications in the area of construction, packaging, furniture, transportation, household items as well as any application areas wherein plastic polymers are used today, such as for packaging, furniture, household products, sportswear, automobile parts, marine equipment (e.g. boats) or in any cellulosic and/or lignin fiber based composite materials. As such composite materials, at least partially comprise grafted copolymer of lignin and/or cellulose as described herein, the composite materials are at least partially biodegradable and thus also environmentally friendly.

Thus, the present disclosure encompasses also products in the area of construction, packaging, furniture, transportation, household items as well as any application areas wherein plastic polymers are used today, such as for packaging, furniture, household products, as well as any other biofiber based composite products such as sportswear, automobile parts, marine equipment (e.g. boats) comprising grafted copolymers of lignin and/or cellulose and/or composite materials as disclosed herein.

It will be appreciated that the method as disclosed herein may be adapted to various mechanical, thermomechanical and chemi-thermomechanical pulping processes where addition points of the synthetic and/or natural monomers/polymers and ways of introducing redox initiators may vary.

While the present invention has been described with reference to various exemplary aspects and embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention is not limited to any particular embodiments contemplated, but that the invention will include all embodiments falling within the scope of the appended items.

BRIEF DESCRIPTION OF THE FIGURES

FIG. 2b is a flow chart illustrating the process as described in Example 1. Additions of reagents are indicated with arrows. Dashed arrow indicates possible monomer addition point in the process.

FIG. 3a is a flow chart illustrating the main steps of a thermomechanical pulp manufacturing process. Additions of reagents are indicated with arrows. Dashed arrow indicates possible monomer addition point in the process. Dashed line indicates optional process steps.

EXAMPLE 1

Figure 2A:
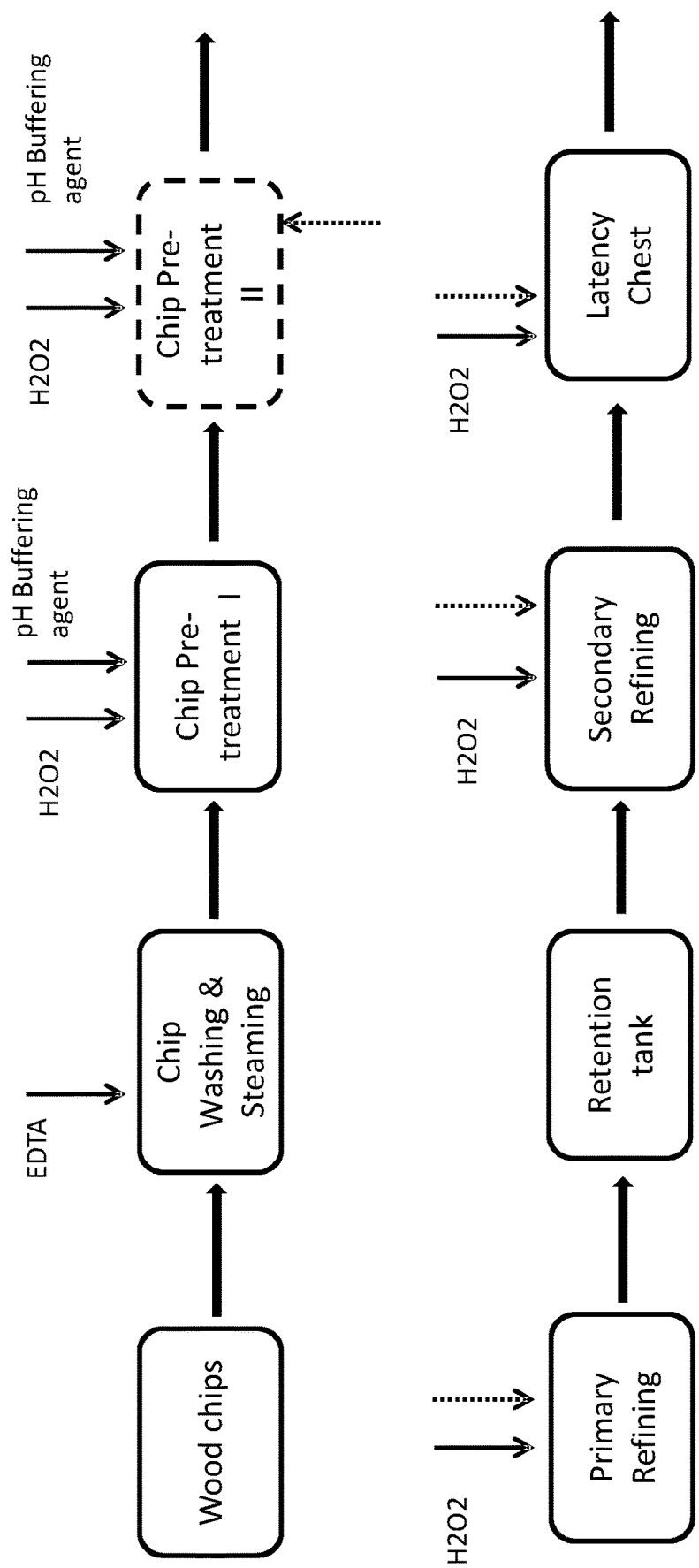
FIG. 2a is a flow chart illustrating the main steps of an alkaline peroxide mechanical pulp manufacturing process. Additions of reagents are indicated with arrows. Dashed arrow indicates possible monomer addition point in the process. Dashed line indicates optional process steps.

This example illustrates the method as disclosed herein implemented in a alkaline peroxide mechanical pulp manufacturing process according to FIGS. 2a and 2b. In this example, polystyrene butadiene is added as polymer.

Figure 1:
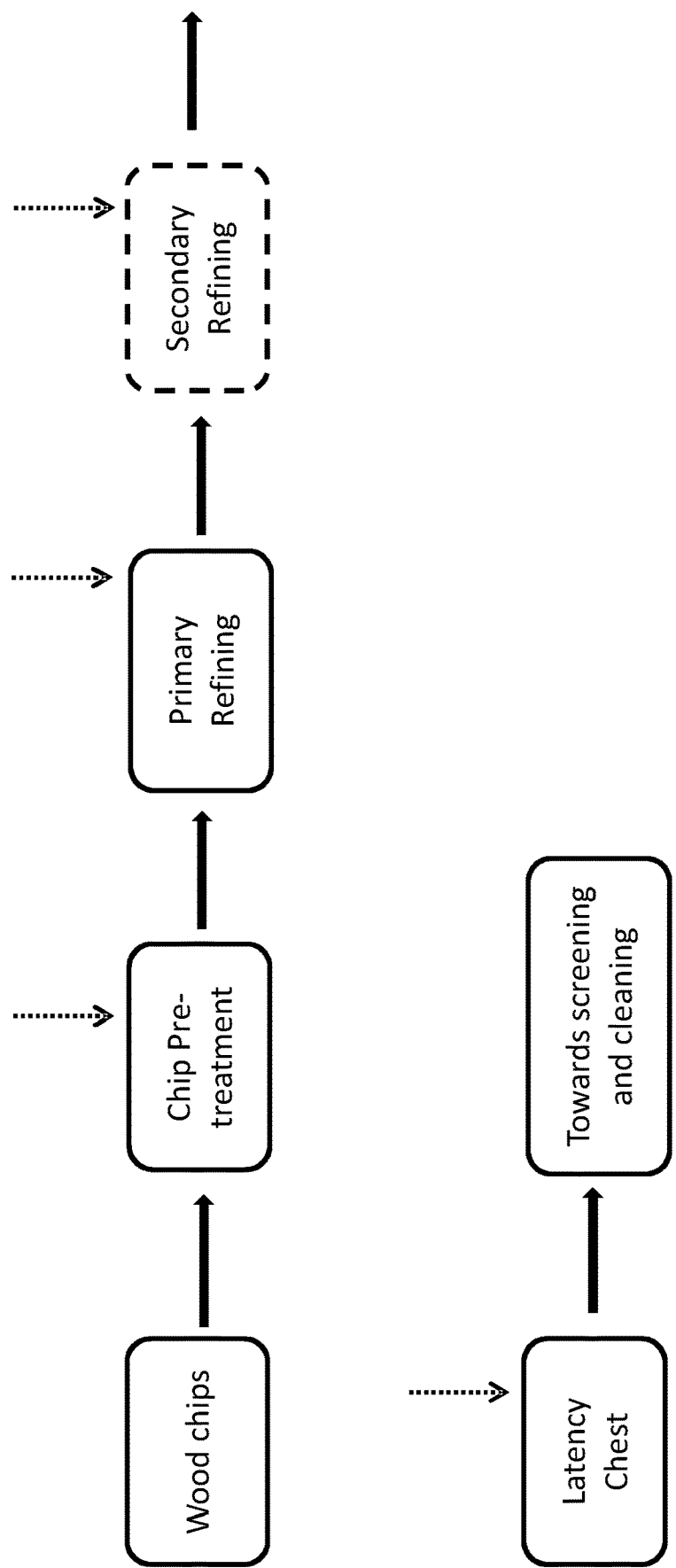
FIG. 1 is a flow chart illustrating the main steps of a general mechanical pulp manufacturing process. Additions of reagents are indicated with arrows. Dashed arrow indicates possible monomer addition point in the process. Dashed line indicates optional process steps.

In the conventional alkaline hydrogen peroxide mechanical pulping processes, the wood chips are washed (position 2 in FIG. 2a) and then followed by one or two stage(s) of hydrogen peroxide treatments (position 3 and 4 in FIG. 2a) where chemicals like oxidizing agents, hydrogen peroxide, alkali, and hydrogen peroxide stabilizing agents, such as silicate and/or magnesium sulfate are added. These peroxide treated chips then go through the first primary refining stage followed by a second stage refining stage before entering the screening and cleaning stage, as illustrated in FIG. 1.

According to the present disclosure, the grafting monomers and/or polymers are added in the alkaline peroxide pre-treatment stage to ensure that grafting polymers are well mixed with the defiberated wood chips. The adding points may be in any of the chip pre-treatment stages, but preferably in the chip pre-treatment stage just before refining whereby macroradicals are formed. It is important that the alkaline peroxide pre-treatment conditions such as temperature and amount of the added monomers and/or polymers are such that there are remaining monomers and/or polymers left in the wood chip mixture prior to the actual refining so that these monomers and/or polymers may be grafted effectively with the macro lignin and/or cellulose radicals generated in the refining stage.

In this particular example, as illustrated in FIG. 2a, Acacia wood chips of southeast Asia origin are used. The wood chips are first pre-steamed for 5 minutes and then impregnated with 0.5 wt % (based on bone-dry wood) EDTA, followed by treating the chips with 4 wt % $H_2O_2$, 4 wt % sodium hydroxide, and 2 wt % silicate, (based on bone-dry wood) for about 45 minutes at a temperature of 60° C. in the pre-treatment I stage in line with the common practice of the alkaline mechanical pulping process. Sodium hydroxide is added in order to adjust the pH-value. In the subsequent pre-treatment II stage, a SBR styrene butadiene latex emulsion with solid content of 45% is charged to the chips (in an amount of 12 wt % based on bone-dry wood) and is thoroughly mixed. These chips then continue to an atmospheric refiner where the chips are refined at a refining temperature of 90° C., whereby macroradicals are being formed. During the refining stage, 1.5 wt % hydrogen peroxide (based on bone-dry wood) is charged to the refiner through refiner eyes. The energy consumption at the refing stage is approximately 900 kWh/BDT pulps.

After refining, the obtained material is treated with a Ultra Turexx type disperser at 6400 rpm for 5 minutes in order to harmonize the fibers, and then washed thoroughly with water once, followed by acetone washing two times, and finally with water again to remove all remaining chemicals in the material. The washed lignocellulosic material are then made into handsheet with brammage of 300 g/m² handsheet through a dynamic sheet former.

The paper handsheet shows good elasticity as well as good three dimensional formability (for example using a press forming device). This indicates that the polystyrene butadiene polymers are attached to these lignin and/or cellulose fibers, making them more elastic.

EXAMPLE 2

Figure 3B:
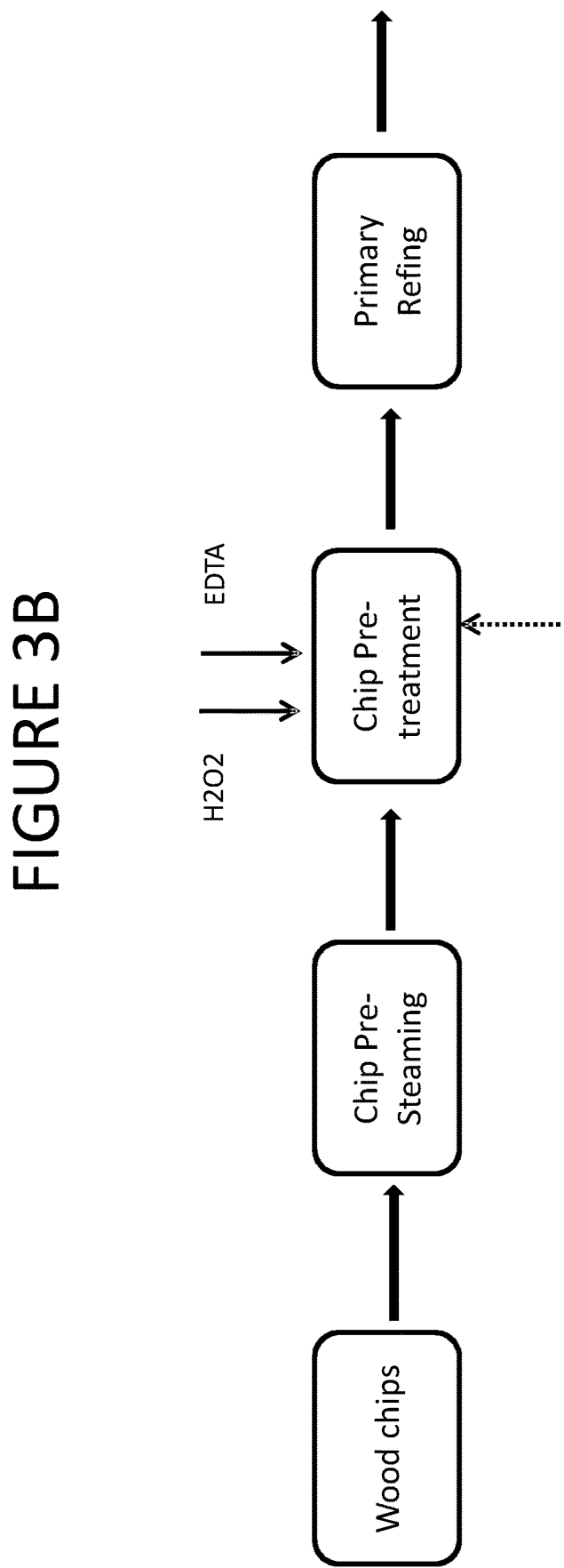
FIG. 3b is a flow chart illustrating the process as described in Example 2. Additions of reagents are indicated with arrows. Dashed arrow indicates possible monomer addition point in the process.

This example illustrates the method as disclosed herein implemented in a thermomechanical pulp manufacturing process according to FIGS. 3a and 3b. In this example methyl methacrylate is added as monomers.

FIG. 3a shows a typical thermomechanical pulping process (TMP). In this process, the wood chips are pre-steamed and, in some processes, pre-defiberated, before going through a primary refining stage. The monomers and/or polymers and hydrogen peroxide initiators are added either in the pre-steaming stage or in the chip pre-treatment stage. It is also an option to add the monomers and/or polymers and hydrogen peroxide right after the refining stage in the blow line where the chips are just defiberated (not shown in FIG. 3a). Alternatively, the monomers and/or polymers may be added after the secondary refining in a latency chest. In both cases, the monomers and/or polymers reacts with the lignin and/or cellulose macroradicals in a substantially oxygen-free environment.

In this example, as illustrated by FIG. 3b, spruce wood chips are used. The wood chips are fed into a steam bin (90° C., 15 minutes) and then passed through a compression screw from Andritz with a geometrical compression ratio of about 4:1 where monomers of methyl methacrylate are charged together with hydrogen peroxide and EDTA at the chip impregnator at the end of the compression screw. The charge of methyl methacrylate is 8 wt %, hydrogen peroxide 3 wt %, EDTA 0.2 wt %, based on bone-dry wood. The treatment time is approximately a few minutes. These mixed wood chips are then fed into a double discs refiner of Andritz type. The refining is performed at a pressure of 5-6 bars and at a temperature of 160-170° C., whereby macroradicals are formed. After refining, the obtained material is treated with a Ultra Turexx type disperser at 6400 rpm for 5 minutes in order to harmonize the fibers, and then washed thoroughly with water once, followed by acetone washing two times, and finally with water again to remove all remaining chemicals in the material. The washed lignocellulosic material are then made into handsheet with brammage of 300 g/m² handsheet through a dynamic sheet former. Water contact angle is a suitable measurement of hydrophobicity of a material or a product, such as a lignocellulosic material. The ungrafted lignin and/or cellulose containing materials is hydrophilic, and once the material is grafted with hydrofobic monomers and/or polymers, the contact angle increases which reflects the degree of grafting. Water contact angle measurements of the formed paper sheets are then performed, and the contact angles reach approximately 98 degrees, which implies that grafting of methyl metharylate has occurred and the sheets of the resulting grafted material is hydrophobic and moisture resistant.

EXAMPLE 3

Figure 4A:
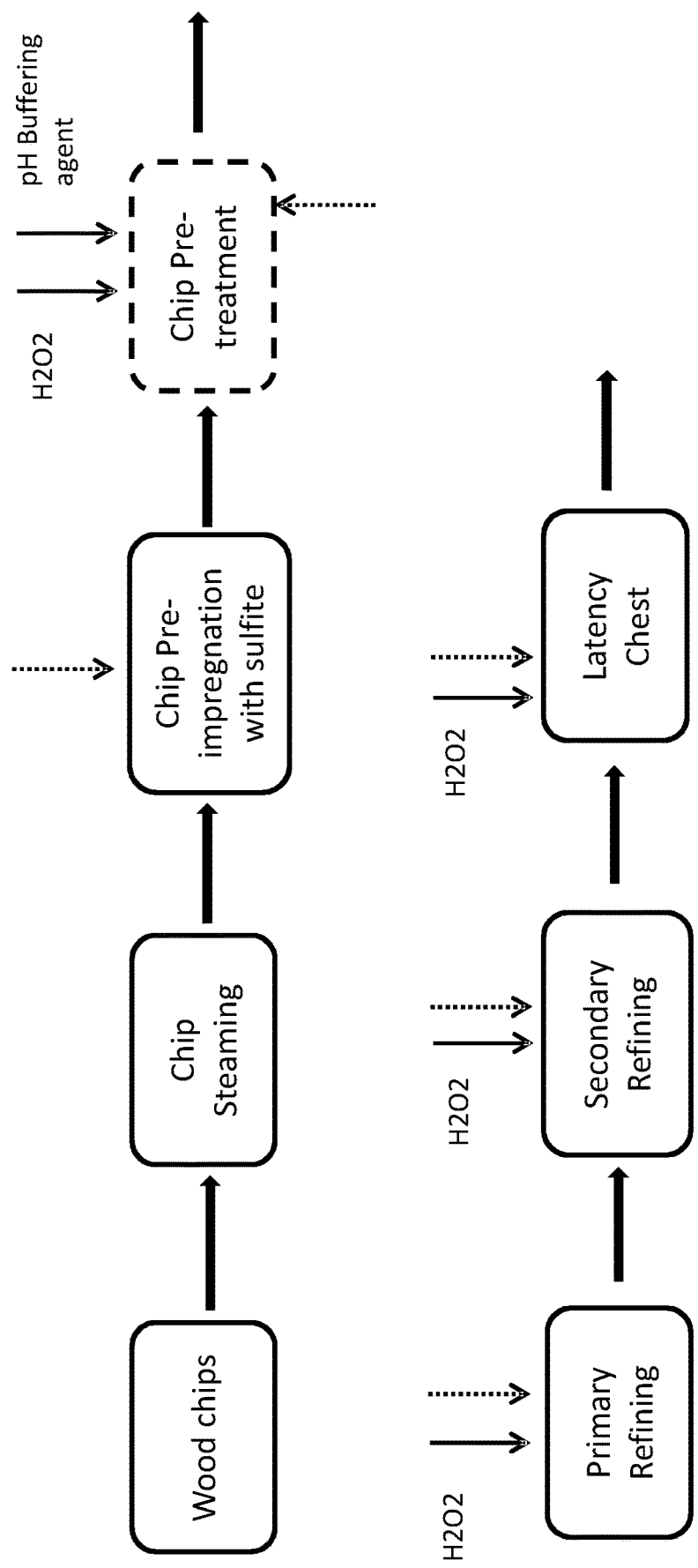
FIG. 4a is a flow chart illustrating the main steps of a chemimechanical pulp manufacturing process. Additions of reagents are indicated with arrows. Dashed arrow indicates possible monomer addition point in the process. Dashed line indicates optional process steps.
Figure 4B:
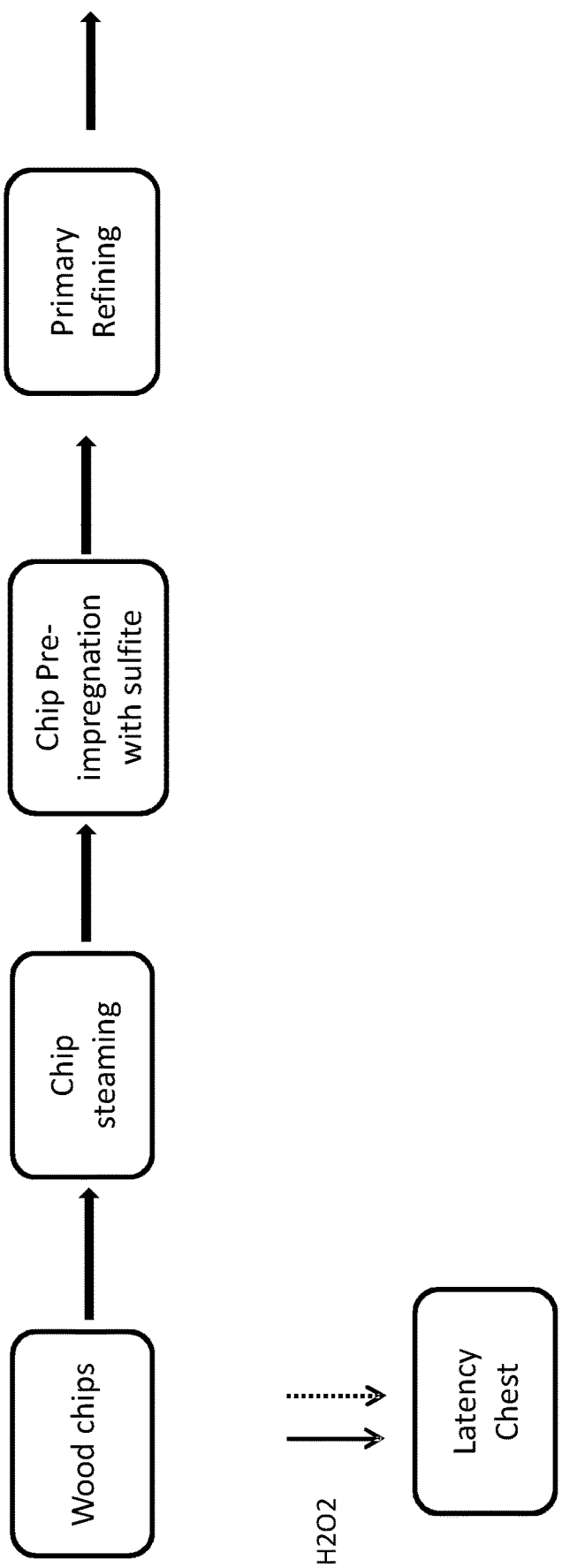
FIG. 4b is a flow chart illustrating the process as described in Example 3. Additions of reagents are indicated with arrows. Dashed arrow indicates possible monomer addition point in the process.
Figure 5:
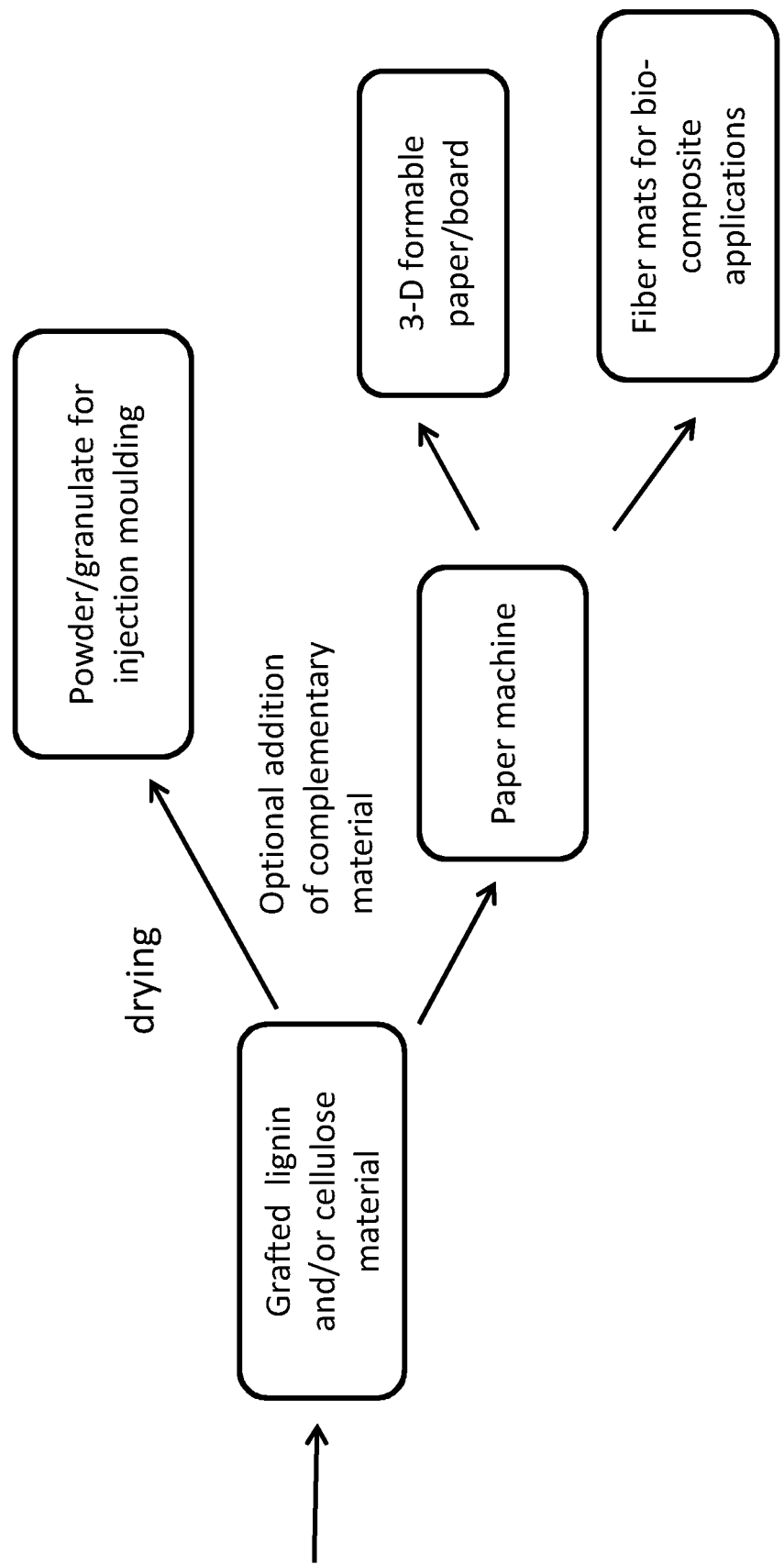
FIG. 5 is a flow chart illustrating options for further treatment of grafted lignin and/or cellulose material to obtain refined products.

This example illustrates the method as disclosed herein implemented in a chemimechanical pulp manufacturing process according to FIGS. 4a and 4b. In this example methyl methacrylate is added as monomers.

FIG. 4a illustrates a typical chemithermomechanical pulping process (CTMP). The chip pre-treatment is often done with sulfite pre-impregnation. In this case, an additional chip pre-treatment stage may be added where monomers and/or polymers and hydrogen peroxide initiators are well mixed with the wood chips before entering the refiner. The monomer and/or polymer radicals to be grafted to the lignin and/or cellulose macroradicals are generated in the refiner.

In this example, as illustrated in FIG. 4b, pine wood chips are used. The wood chips are fed into a steam bin (90° C., 15 minutes), and then passed through a compression screw from Andritz with a geometrical compression ratio of about 4:1 where 0.6 wt % sodium sulfite is charged, based on bone-dry wood. The treatment time is approximately a few minutes. These mixed wood chips are then fed into a double discs refiner of Andritz type. The refining is performed at a pressure of 5-6 bars and at a temperature of 160-170° C. Immediately after the refining in the latency chest, whereby the macroradicals are formed, methyl metharcrylate of 6 wt %, hydrogen peroxide 2.5 wt % and EDTA 0.2 wt %, based on bone-dry wood, are charged. The latency chest temperature is higher than 90° C. The lignin and/or cellulose containing material is stayed in the latency chest for about 10 minutes. The material is then washed and is made into handsheet through a dynamic sheet former.

Water contact angle measurements of the obtained paper sheets are then performed. It is expected that the contact angles reached approximately 98 degrees, which implies that grafting of methyl metharylate has occurred and the sheets of the resulting grafted material is hydrophobic and moisture resistant.

EXAMPLE 4

Figure 6:
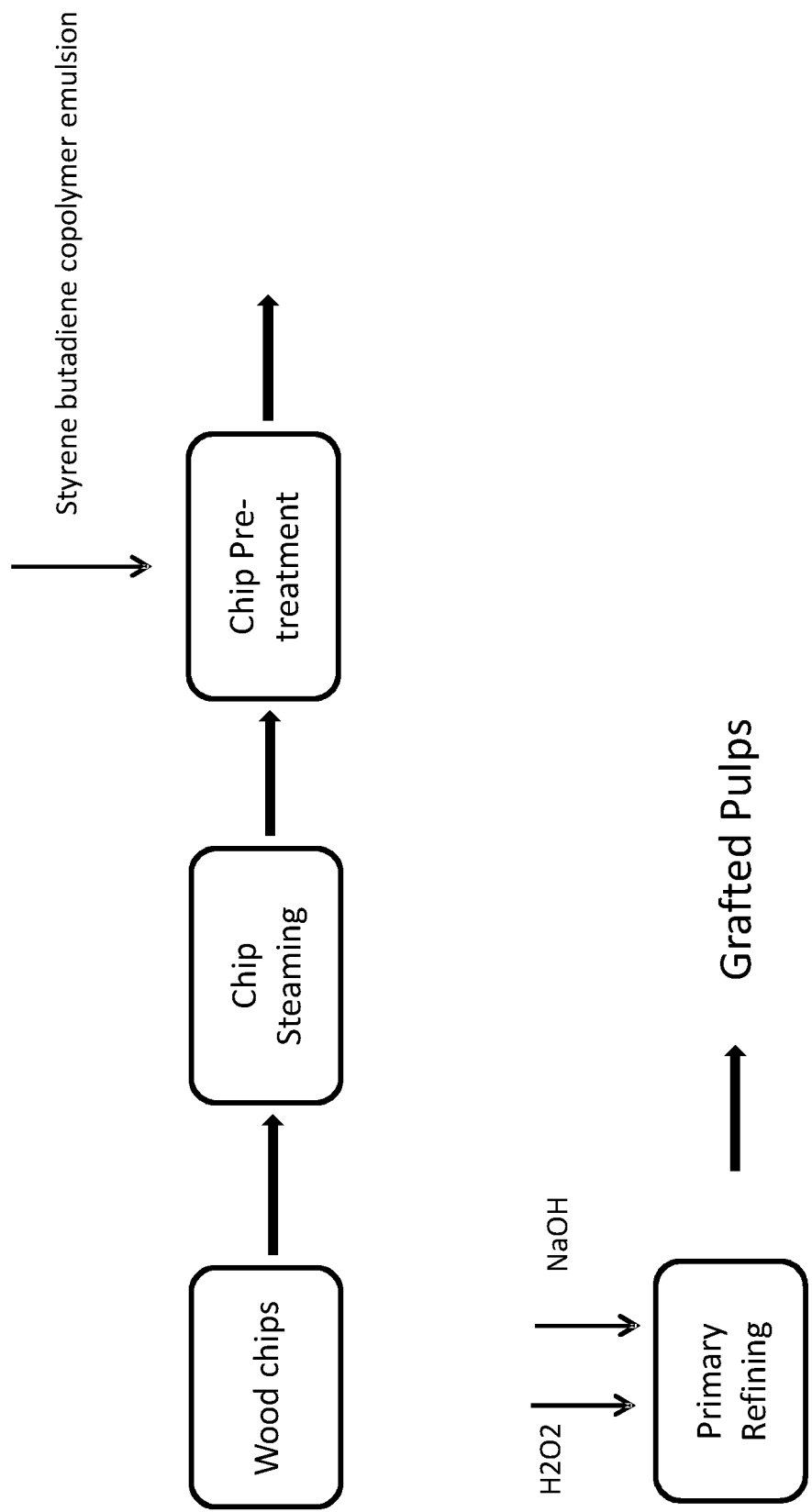
FIG. 6 is a flow chart illustrating the process as described in Example 5. Additions of reagents are indicated with arrows.
Figure 7:
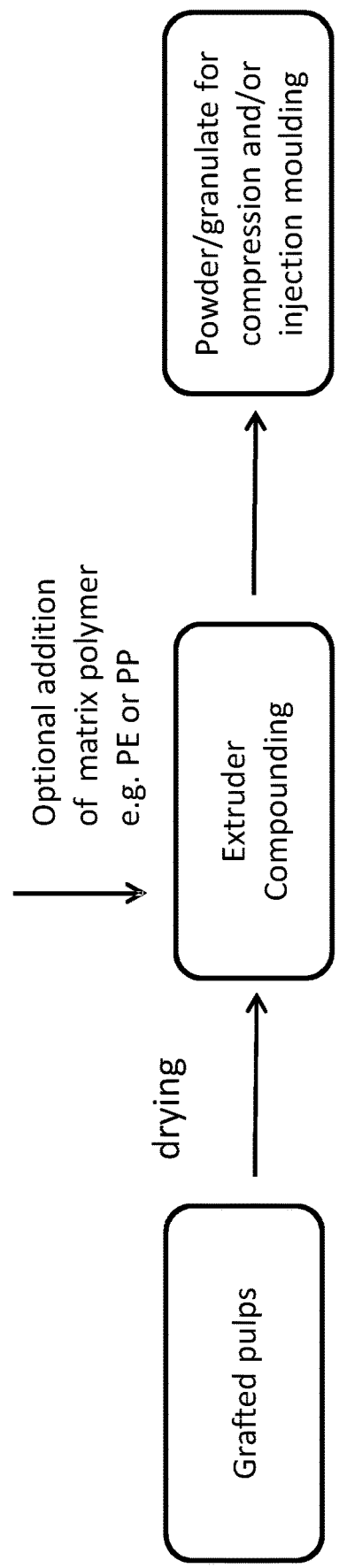
FIG. 7 is a flow chart illustrating steps in a typical compounding process wherein powder/granulate for compression and/or injection moulding is produced.

This example illustrates the method as disclosed herein implemented in a thermomechanical pulping process according to FIG. 6. This example utilizes refining with the polymer polystyrene butadiene.

In this example, fresh wood chips of Norwegian spruce with a dry content of 43.8% were used. The wood chips were fed into a steam bin (90° C., 45 minutes) and then passed through a MSD impressafiner from Andritz with a geometrical compression ratio of about 4:1, where aqueous dispersion of polystyrene butadiene polymer (obtained from BASF) was charged at the end of the MSD impressafiner in an amount of 10 wt % (based on bone-dry wood), through a pre-impregnator vessel. The metal content of the wood chips was measured and is presented in Table 1:

TABLE 1

| Spruce chips | Before steam bin | After MSD impressafiner |
|---|---|---|
| Iron, mg/kg | 6.6 | 45.0 |
| Copper, mg/kg | <0.2 | <0.2 |
| Magnesium, mg/kg | 81.9 | 78.3 |
| Manganese, mg/kg | 77.9 | 75.8 |

As can be seen in Table 1, the wood chips had an iron content of 45 mg/kg after the MSD impressafiner, increasing from 6.6 mg/kg of the native wood, due to wearing and washing of iron from the MSD equipment.

The treatment time in the MSD impressafiner was approximately a few minutes. The mixed wood chips were then fed into a double discs refiner of Andritz type. The refining was performed at a pressure of 2 bars and at a temperature of 140° C. The specific refining energy consumption was around 370 kWh/BDT, and the outcome pulp consistency was 40%.

A reference comparison experiment was done similarly as above, but with only water added in the MSD impressafiner through the pre-impregnator vessel, (i.e. without any polystyrene butadiene added), and with only dilution water added into the refiner (i.e without hydrogen peroxide added). Thus, hydrogen peroxide is absent in both experiments (i.e. the experiment with copolymer and the experiment without copolymer). In the reference experiment the specific refining energy consumption was 350 kWh/BDT, and the outcome pulp consistency was 33%.

After refining, the obtained material was treated with a Ultra Turexx type disperser at 6400 rpm for 5 minutes in order to harmonize the fibers, and then the material was washed thoroughly with water once, followed by acetone washing two times, and finally with water again to remove all remaining chemicals in the material. The material was then made into hand sheet by a Rapid Kothen standard hand sheet former.

Water contact angle measurements of these paper sheets were then performed, with calibrated droplets (0.3 µl) of water deposited at the top side surface of the handsheet sample. The results are shown in FIG. 8.

Figure 8:
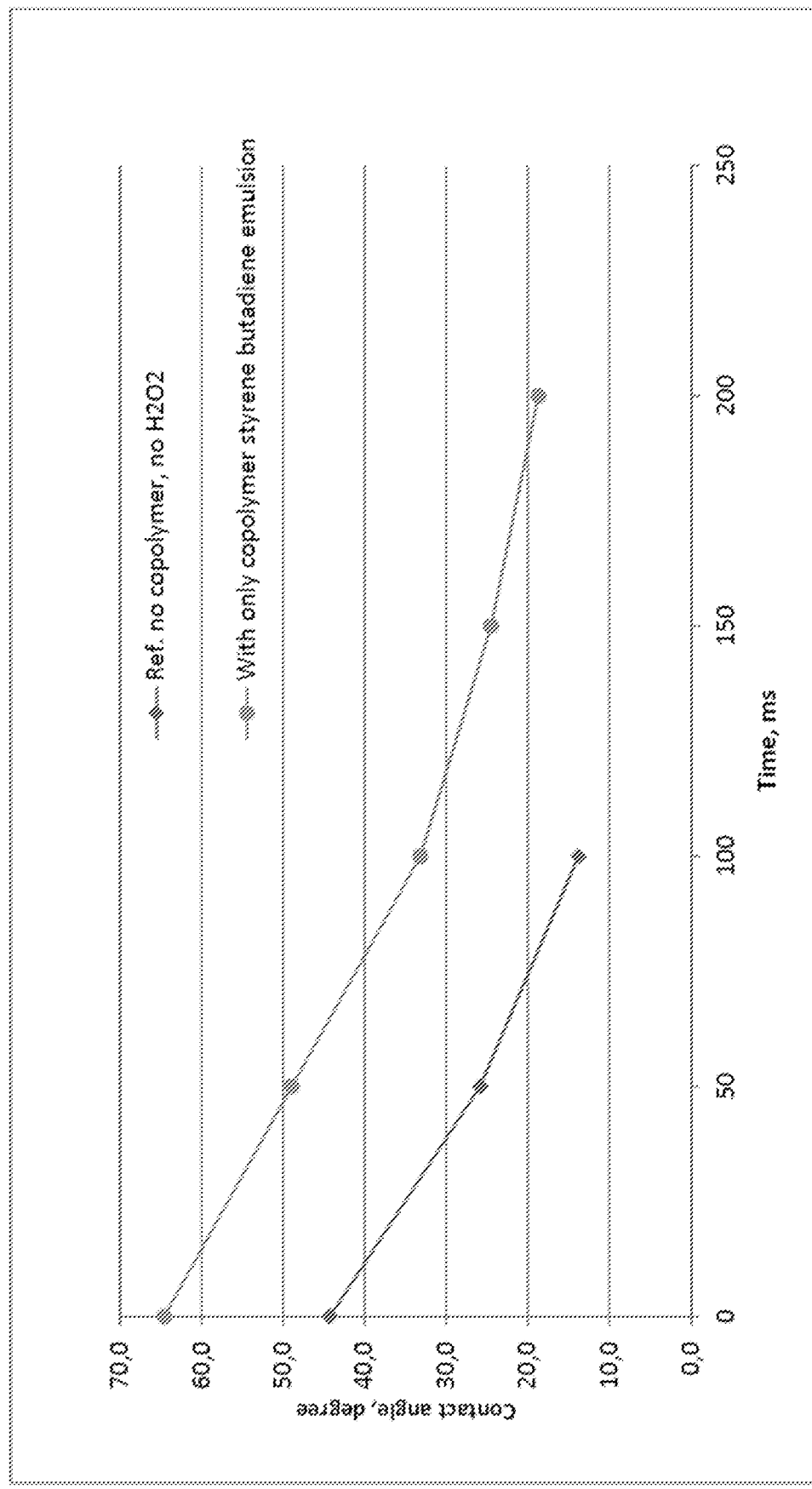
FIG. 8 is a diagram illustrating the water contact angle (degree) versus time (ms) measured in Example 4. A grafting reaction utilizing the polymer polystyrene butadiene is compared to a reference system where only water is added.

As can be seen in FIG. 8, the refining with polystyrene butadiene polymer provided higher water contact angle compared with the reference experiment, indicating that grafting of polystyrene butadiene polymer to the wood fibers has occurred.

EXAMPLE 5

This example illustrates the method as disclosed herein implemented in a thermomechanical pulping process according to FIG. 6. This example utilizes refining with the polymer polystyrene butadiene and addition of a redox initiator, hydrogen peroxide, and a base, sodium hydroxide.

In this example, fresh wood chips of Norwegian spruce with a dry content of 43.8% were used. The wood chips were fed into a steam bin (90° C., 45 minutes) and then passed through a MSD impressafiner from Andritz with a geometrical compression ratio of about 4:1, where aqueous dispersion of polymers of polystyrene butadiene (obtained from BASF) was charged at the end of the MSD impressafiner in an amount of 10 wt % (based on bone-dry wood), through a pre-impregnator vessel. The metal content of the wood chips was measured and the result is presented in Table 1 above.

As can be seen in Table 1, the wood chips had an iron content of 45 mg/kg after the MSD impressafiner, increasing from 6.6 mg/kg of the native wood, due to wearing and washing of iron from the MSD equipment.

The treatment time in the MSD impressafiner was approximately a few minutes. The mixed wood chips were then fed into a double discs refiner of Andritz type. The refining was performed at a pressure of 2 bars and at a temperature of 140° C. The hydrogen peroxide solution was charged through a liquor pump into the refiner eye in an amount of 6 wt % (based on bone-dry wood). Sodium hydroxide solution was charged in an amount of 0.8 wt % (based on bone-dry wood) through another dosing point just before the refiner eye by another pump. The specific refining energy consumption was around 400 kWh/BDT, and the outcome pulp consistency was 45%.

After refining, the obtained material was treated with a Ultra Turexx type disperser at 6400 rpm for 5 minutes in order to harmonize the wood fibers, and then the material was washed thoroughly with water once, followed by acetone washing two times, and finally with water again to remove all remaining chemicals in the material, and then the material was made into hand sheet by a Rapid Kothen standard hand sheet former.

Water contact angle measurements of these paper sheets were then performed, with calibrated droplets (0.3 µl) of water deposited at the top side surface of the handsheet sample. The results are shown in FIG. 9.

The purpose of adding sodium hydroxide to the refiner was to keep the refining environment at neutral pH. As explained before, the formation of lignin and/or cellulose macroradiocals is believed to be favorable formed at neutral pH. Additionally or alternatively, addition of hydrogen peroxide, without the addition of sodium hydroxide, would lead to acidic conditions in the refiner. It is believed that this would cause acidic hydrolysis of the lignin and/or cellulose backbone and may lead to e.g. increased fiber hydrophilicity and reduced fiber strength.

Figure 9:
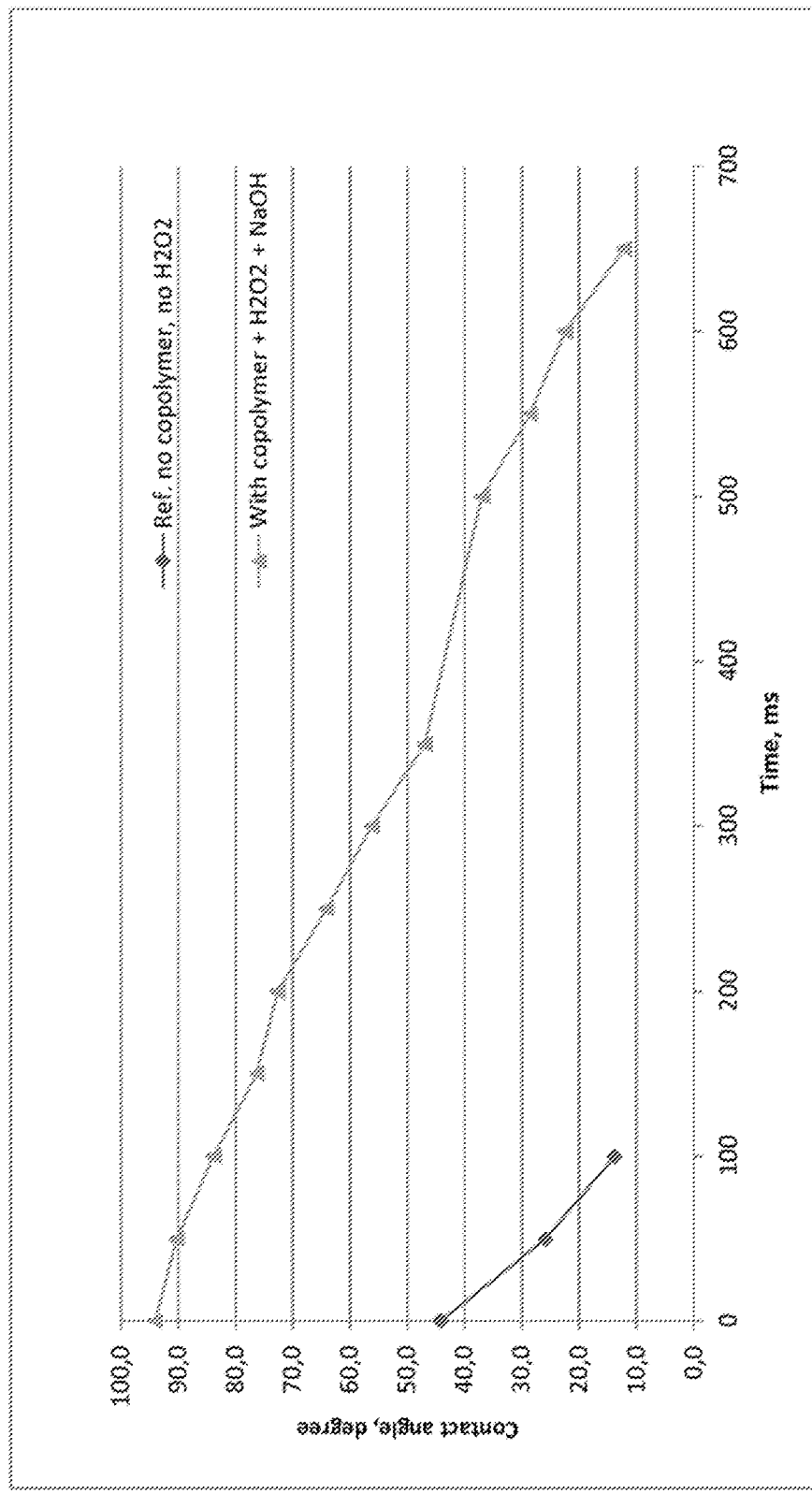
FIG. 9 is a diagram illustrating the water contact angle (degree) versus time (ms) measured in Example 5. A grafting reaction utilizing the polymer polystyrene butadiene together with addition of $H_2O_2$ and NaOH is compared to a reference system where only water is added.

As is shown in FIG. 9, by charging hydrogen peroxide and sodium hydroxide in the refiner eye, an increased water contact angle is obtained. Thus, an enhanced fiber hydrophobicity is obtained. An increased water contact angle indicates a higher degree of grafting with polystyrene butadiene polymer, compared to the experiment where only copolymer is added (but no $H_2O_2$ or NaOH).

An additional experiment was also performed with fresh wood chips of Norwegian spruce with addition of polystyrene butadiene (10 wt %, based on bone-dry wood) with an addition of the redox initiator $H_2O_2$ (6 wt %, based on bone-dry wood) but without addition of a pH regulator, such as NaOH. An increased water contact angle was obtained compared to the experiment where the redox initiator is absent. However, the water contact angle was not as large as for the experiment with addition of both redox initator and pH regulator. It is believed that the formation of lignin and/or cellulose macroradiocals are favored at neutral pH.

EXAMPLE 6

Figure 10:
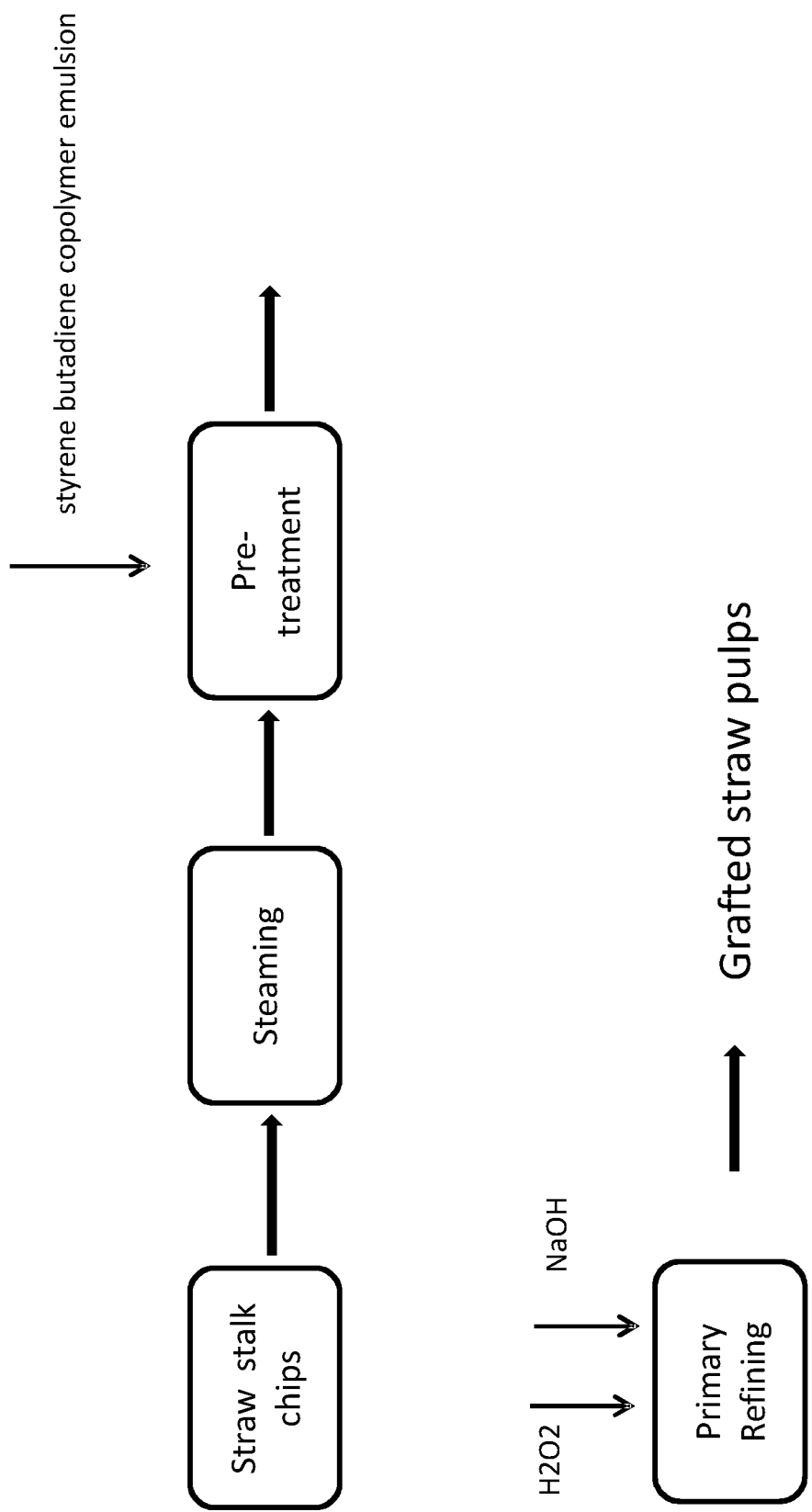
FIG. 10 is a flow chart illustrating steps in a pulp manufacturing process where straw is utilized as lignin and/or cellulose containing material.

This example illustrates the method as disclosed herein implemented in a thermomechanical pulping process according to FIG. 10. This example utilizes refining with the polymer polystyrene butadiene and addition of a redox initiator, hydrogen peroxide, and a base, sodium hydroxide.

In this example, wheat straw stalk chips with a dry content of 74.5% were used. The straw chips were hammermilled through a screen with 2.53 cm holes and then soaked in water. These soaked straw chips were fed into a steam bin (90° C., 45 minutes) and then passed through a MSD impressafiner compression screw from Andritz with a geometrical compression ratio of about 4:1, where aqueous dispersion of polymers of polystyrene butadiene (obtained from BASF), was charged at the end of the MSD impressafiner in an amount of 10 wt % (based on bone-dry wood), through a pre-impregnator vessel. The metal content of the wood chips was analyzed as the following:

TABLE 2

| Straw chips | Before steam bin | After MSD Impressafiner |
|---|---|---|
| Iron, mg/kg | 47.6 | 75.0 |
| Copper, mg/kg | 3.8 | 3.6 |
| Magnesium, mg/kg | 1051.9 | 932.6 |
| Manganese, mg/kg | 30.9 | 30.5 |

As can be seen in Table 2, the straw chips had an iron content of 75 mg/kg after the MSD impressafiner, increasing from 47.6 mg/kg of the native material, due to wearing and washing of iron from the MSD equipment. This implies that no additional iron ions need to be added for initiating the catalytic redox reactions of hydrogen peroxide. Manganese of about 30 mg/kg was also present in the material. It is believed that, according to this experiment, manganese ions together with iron ions (naturally occurring and due to wearing and washing of iron from the MSD equipment) are enough to initiate redox reactions of hydrogen peroxide.

The treatment time in the MSD impressafiner was approximately a few minutes. The mixed straw chips were then fed into a double discs refiner of Andritz type. The refining was performed at a pressure of 2 bars and at temperature of 140° C. The hydrogen peroxide solution was charged through a liquor pump into the refiner eye in an amount of 5 wt % (based on bone-dry wood). Sodium hydroxide solution was charged in an amount of 0.7 wt % (based on bone-dry wood) through another dosing point just before the refiner eye through another pump. The specific refining energy consumption was around 360 kWh/BDT, and the outcome pulp consistency was 45%.

A reference comparison experiment was done similarly as above, but with only water added in the MSD impressafiner through the pre-impregnator vessel, (i.e. without any polystyrene butadiene added), and with only dilution water added into the refiner through the refiner eye (i.e. without redox initator). In this case, the specific refining energy consumption was 330 kWh/BDT, and the outcome pulp consistency was 33%.

After refining, the obtained material was treated with a Ultra Turexx type disperser at 6400 rpm for 5 minutes in order to harmonize the straw wood fibers, and then the material was washed thoroughly with water once, followed by acetone washing two times, and finally with water again to remove all remaining chemicals in the material, and then the material was made into hand sheet with grammage of 120 g/m$^2$ through a Rapid Kothen standard hand sheet former.

Water contact angle measurements of these paper sheets were then performed, with calibrated droplets (0.3 µl) of water deposited at the top side surface of the handsheet sample. The results are shown in FIG. 11.

Figure 11:
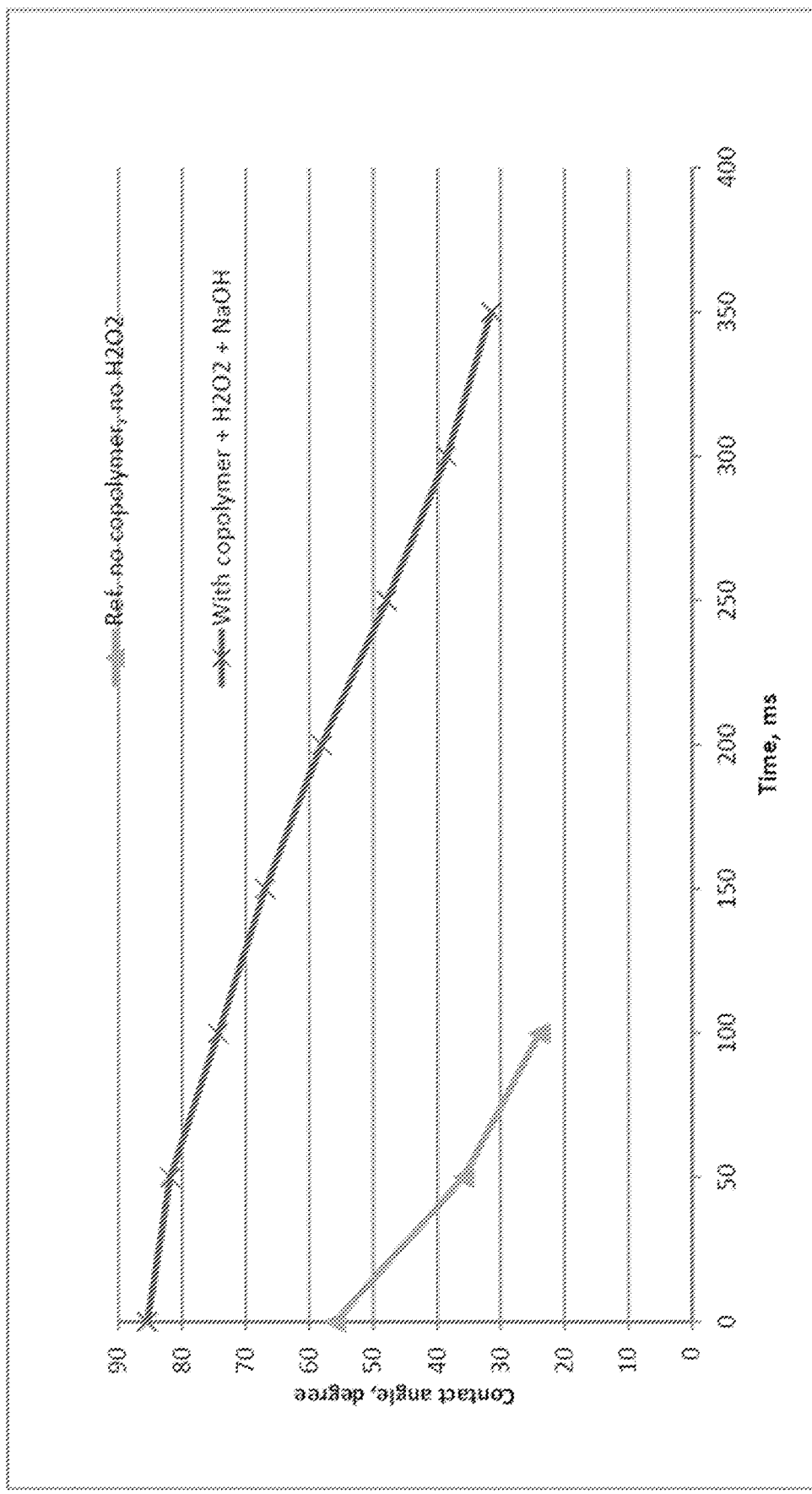
FIG. 11 is a diagram illustrating the water contact angle (degree) versus time (ms) measured in Example 6 where straw chips are utilized. A grafting reaction utilizing the polymer polystyrene butadiene (SB) together with addition of $H_2O_2$ and NaOH is compared to a reference system where only water is added.

As is shown in FIG. 11, by charging polystyrene butadiene copolymer emulsion and refining in the presence of hydrogen peroxide and sodium hydroxide, an enhanced fiber hydrophobicity was obtained which indicates a higher degree of grafting with polystyrene butadiene polymer compared to the experiment with straw but without addition of hydrogen peroxide and sodium hydroxide.

EXAMPLE 7

Similarly, the same process steps, as in Example 6, can be applied to bagasse. In this particular case, a depithed bagasse material was used. The bagasse material was first soaked with water and steamed, and then pressed through a MSD impressafiner, followed by impregnation with a polystyrene butadiene emulsion with an amount of 10 wt % (based on bone-dry weight of bagasse), and then further refined with a double disc refiner of Andritz type at a pressure of 2 bars and at a temperature of 140° C., together with 5 wt % hydrogen peroxide and with 0.7 wt % NaOH (based on bone-dry wood) to keep the refining at slightly neutral conditions.

A reference sample was prepared in a similar way, but with impregnation with only deionized water and without hydrogen peroxide being charged into the refiner eye. Handsheets of both samples were then made and water contact angle analyzed. The contact angle results showed enhanced fiber hydrophobicity for the polystyrene butadiene treated sample which indicates grafting of hydrophobic polystyrene butadiene to the bagasse fibers.

Thus, the data provided herein show that the method disclosed herein provides good results for various choices of lignin and/or cellulose containing materials.

ITEMIZED LIST OF EMBODIMENTS

1. A method of preparing a grafted copolymer of lignin and/or cellulose, wherein said method comprises the steps of:
    subjecting a lignin and/or cellulose containing material selected from the group consisting of wood chips, such as defiberated wood chips, and pulp in an oxygen reduced environment to a redox initiator,
    exposing said lignin and/or cellulose containing material to mechanical impact, and
    subjecting said lignin and/or cellulose containing material to monomers and/or polymers before, during and/or immediately after exposure to mechanical impact,
    wherein macroradicals are generated in situ by mechanical impact on the backbone of the lignin and/or cellulose of said lignin and/or cellulose containing material, and
    wherein the monomers and/or polymers are grafted to the backbone of said lignin and/or cellulose.
2. A method according to item 1, wherein the wood chips are selected from the group consisting of wood, bamboo, straw, bagasse, kenaf, ramie, hemp, jute, sisal, empty fruit branch from oil palm, and cotton.
3. A method according to item 2, wherein the wood chips are hardwood or softwood.
4. A method according to any preceding item, wherein the pulp is mechanical pulps or semi-mechanical pulps.
5. A method according to any one of items 1-3, wherein the pulp is cellulose containing material, such as sulfate chemical pulps, sulfite pulps, or dissolving pulps.

6. A method according to any one of items 1-3, wherein the wood chips and/or defiberated wood chips have a length in the range of 5-30 mm, a thickness in the range of 3-25 mm and a width in the range of 3-25 mm.
7. A method according to any one of items 1-6, wherein the wood chips and/or defiberated wood chips are chemically pre-treated.
8. A method according to any one of items 1-7, wherein the defiberated wood chips are compressionally destructed wood chips with partially open structure.
9. A method according to any of the preceding items, wherein the oxygen reduced environment is oxygen deficient.
10. A method according to any of the preceding items, wherein the redox initiator is selected from the group consisting of hydrogen peroxide, per-acetic acid, 2-hydroperoxy-1,4-dioaycyclohexane, 3,3-dimethyl-1,2-dioxybutane, 1-hydroperoxybenzene, 1-(2-hydroperoxypropyl)benzene, periodate based oxidant, such as potassium periodate, and anhydrous solid peroxides, such as magnesium peroxyphthalate, sodium peroxyborate and sodium percarbonate.
11. A method according to item 10, wherein the redox initiator is $H_2O_2$.
12. A method according to any of the preceding items, wherein the mechanical impact is grinding, milling and/or refining.
13. A method according to item 12, wherein said mechanical impact is performed under a pressure of 1-7 bars, a temperature in the range of 60-190° C. and specific energy consumption of 300-2900 kWh/BDT (bone-dry ton).
14. A method according to any of the preceding items, wherein the monomers have at least one double or triple bond, such as monomers selected from acrylates, styrenes and butadienes.
15. A method according to any of the preceding items, wherein the polymers have at least one double or triple bond, such as polyisoprene, polychloroprene, polybutadiene, and polystyrene butadiene.
16. A method according to any of the preceding items, wherein additional macroradicals are generated by subjecting the lignin and/or cellulose containing material to the redox initiator.
17. A method according to any of the preceding items, wherein transitional transition metal ions are added simultaneously together with redox initiator.
18. A method according to item 17, wherein said transitional metal ions are ferrous ions.
19. A method according to any of the preceding items, further comprising a pH regulating agent, such as NaOH.
20. A method according to any of the preceding items, wherein the monomers and/or polymers are grafted to the backbone of the lignin and/or cellulose of said lignin and/or cellulose containing material where the macroradicals are formed.
21. A method according to any of the preceding items, wherein the lignin and/or cellulose containing material is subjected to monomers and/or polymers during a wood chip pre-treatment step.
22. A method according to item 21, wherein the lignin and/or cellulose containing material is subjected to at least one pre-treatment step, such as at least two pre-treatment steps, such as three pre-treatment steps.
23. A method according to any of the preceding items, wherein the lignin and/or cellulose containing material is subjected to monomers and/or polymers during a primary refining step and/or secondary refining step.
24. A method according to any of the preceding items, wherein the lignin and/or cellulose containing material is subjected to monomers and/or polymers during a latency chest step.
25. A method according to any of the preceding items, wherein the lignin and/or cellulose containing material is subjected to monomers and/or polymers during a wood chip pre-treatment step, a primary refining step, a secondary refining step and/or a latency chest step in an alkaline peroxide mechanical pulping process.
26. A method according to any of items 1-24, wherein the lignin and/or cellulose containing material is subjected to monomers and/or polymers during a wood chip pre-steaming step, a wood chip pre-treatment step, a primary refining step, a secondary refining step and/or a latency chest step in a thermomechanical pulping process.
27. A method according to any of items 1-24, wherein the lignin and/or cellulose containing material is subjected to monomers and/or polymers during a wood chip pre-impregnation with sulfite step, a wood chip pre-treatment step, a primary refining step, a secondary refining step and/or a latency chest step in a chemimechanical pulping process.
28. A method according to any of the preceding items, wherein the pressure in the refining step is in the range of 1-7 bars.
29. A method according to item 26 or 27, wherein the pressure is 2-7, such as 6-7 bars, in the primary refining step or the secondary refining step.
30. A method according to item 25, wherein the pressure is about 1 bar in the primary refining step.
31. A method according to any of the preceding items, wherein the temperature in the refining step is in the range of 60-190° C.
32. A method according to any one of items 1-30, wherein the temperature is in the range of 120-170° C. in the mechanical refining step.
33. Grafted copolymer of lignin and/or cellulose obtainable by the method according to any one of items 1-32.
34. An article comprising the grafted copolymer according to item 33.
35. An article according to item 34 which is selected from the group consisting of packaging products, furniture products, household products and lignin and/or cellulose fiber based composite products.
36. Use of the grafted copolymer of lignin and/or cellulose according to item 33 for applications in construction, packaging, furniture, household products or in any lignin and/or cellulose fiber based composite materials.
37. Composite material comprising at least one grafted copolymer of lignin and/or cellulose according to item 33.
38. Use of the composite material according to item 37 for applications in construction, packaging, furniture, household products or in any lignin and/or cellulose fiber based composite materials.
39. Composite material according to item 37, comprising a second, complementary material, such as a material selected from the group consisting of poly(hydroxyl butyrate), biopolymers of the alkanoates family, poly (lactic acid) and polyolefins.
40. Use of the composite material according to item 39 for applications in construction, packaging, furniture, household products or in any lignin and/or cellulose fiber based composite materials.

The invention claimed is:

1. A method of preparing a grafted copolymer of lignin and/or cellulose, wherein said method comprises the steps of:
   subjecting a lignin and/or cellulose containing material selected from the group consisting of wood chips and pulp, in an oxygen reduced environment to a redox initiator,
   exposing said lignin and/or cellulose containing material to mechanical impact, and
   subjecting said lignin and/or cellulose containing material to monomers and/or polymers before, during and/or immediately after exposure to mechanical impact,
   wherein macroradicals are generated in situ by mechanical impact on the backbone of the lignin and/or cellulose of said lignin and/or cellulose containing material, and
   wherein the monomers and/or polymers are grafted to the backbone of said lignin and/or cellulose.

2. A method according to claim 1, wherein said wood chips are selected from the group consisting of wood, bamboo, straw, bagasse, kenaf, ramie, hemp, jute, sisal, empty fruit branch from oil palm, and cotton, and any combination thereof.

3. A method according to claim 1, wherein said pulp is selected from the group consisting of mechanical pulps, semi-mechanical pulps, sulfate chemical pulps, sulfite pulps, dissolving pulps, cellulose and cellulose derivatives, and any combination thereof.

4. A method according to claim 1, wherein the oxygen reduced environment is oxygen deficient.

5. A method according to claim 4, wherein said oxygen reduced environment is reduced at least 50% compared to the oxygen concentration in air.

6. A method according to claim 1, wherein the lignin and/or cellulose containing material is chemically pretreated.

7. A method according to claim 1, wherein the redox initiator is selected from the group consisting of hydrogen peroxide, peracetic acid, potassium periodate, sodium percarbonate, and any combination thereof.

8. A method according to claim 7, wherein the redox initiator is hydrogen peroxide, at a concentration of 1-10 wt % based on bone-dry wood.

9. A method according to claim 1, further comprising a pH regulator.

10. A method according to claim 1, wherein the mechanical impact is grinding, milling and/or refining.

11. A method according to claim 1, wherein the monomers and/or polymers comprise at least one double or triple bond.

12. A method according to claim 1, wherein the monomers are selected from the group consisting of styrene butadiene, isoprene, chloroprene, methyl methacrylate, and glycidyl methacrylate, and any combination thereof.

13. A method according to claim 1, wherein the polymers are selected from the group consisting of polyisoprene, polychloroprene, polybutadiene, polystyrene butadiene, poly(styrene-co-butyl acrylate), and poly(vinyl acetate-co-ethylene), and any combination thereof.

14. A method according to claim 1, wherein the monomers and/or polymers are added to the lignin and/or cellulose containing material in an amount of in the range of 5-30 wt % based on bone-dry wood.

15. A method according to claim 1, wherein the lignin and/or cellulose containing material is subjected to monomers and/or polymers during a pre-treatment step.

16. A method according to claim 1, wherein the lignin and/or cellulose containing material is subjected to monomers and/or polymers during a primary refining step and/or secondary refining step.

* * * * *